(12) United States Patent
Moore

(10) Patent No.: US 8,577,651 B2
(45) Date of Patent: Nov. 5, 2013

(54) BI-DIRECTIONAL PROJECTION

(75) Inventor: Alan John Moore, Devon (GB)

(73) Assignee: The MathWorks, Inc., Natick, MA (US)

( * ) Notice: Subject to any disclaimer, the term of this patent is extended or adjusted under 35 U.S.C. 154(b) by 1113 days.

(21) Appl. No.: 12/138,854

(22) Filed: Jun. 13, 2008

(65) Prior Publication Data
US 2008/0313600 A1     Dec. 18, 2008

Related U.S. Application Data

(60) Provisional application No. 60/944,228, filed on Jun. 15, 2007, provisional application No. 61/060,364, filed on Jun. 10, 2008.

(51) Int. Cl.
*G06G 7/48*     (2006.01)
*G06G 7/66*     (2006.01)
*G06G 7/70*     (2006.01)

(52) U.S. Cl.
USPC ............................................................ 703/6

(58) Field of Classification Search
None
See application file for complete search history.

(56) References Cited

U.S. PATENT DOCUMENTS

| | | | | |
|---|---|---|---|---|
| 6,295,636 | B1 * | 9/2001 | Dupenloup | 716/103 |
| 6,865,726 | B1 * | 3/2005 | Igusa et al. | 716/105 |
| 6,901,055 | B1 * | 5/2005 | Hoe et al. | 370/252 |
| 7,073,148 | B1 * | 7/2006 | Jenkins | 716/112 |

OTHER PUBLICATIONS

Notification of Transmittal of the International Search Report and the Written Opinion of the International Searching Authority, of the Declaration, Jan. 30, 2009, 12 pages.

\* cited by examiner

*Primary Examiner* — Suzanne Lo
(74) *Attorney, Agent, or Firm* — Harrity & Harrity, LLP

(57) ABSTRACT

In an embodiment, one or more computer-readable media holding executable instructions is provided. The instructions may be executed on a processing device to project a specification to a platform environment that includes a system model. The media may hold one or more instructions for accessing an algorithm model, the algorithm model being associated with the specification. The media may further hold one or more instructions for projecting the specification to the system model via a forward projection. The media may hold one or more instructions for receiving a reverse projection that includes specification changes, the specification changes identifying suggested changes to the specification. The media may further hold one or more instructions for modifying the algorithm model based on the specification changes, and the media may hold one or more instructions for storing the modified algorithm model.

20 Claims, 21 Drawing Sheets

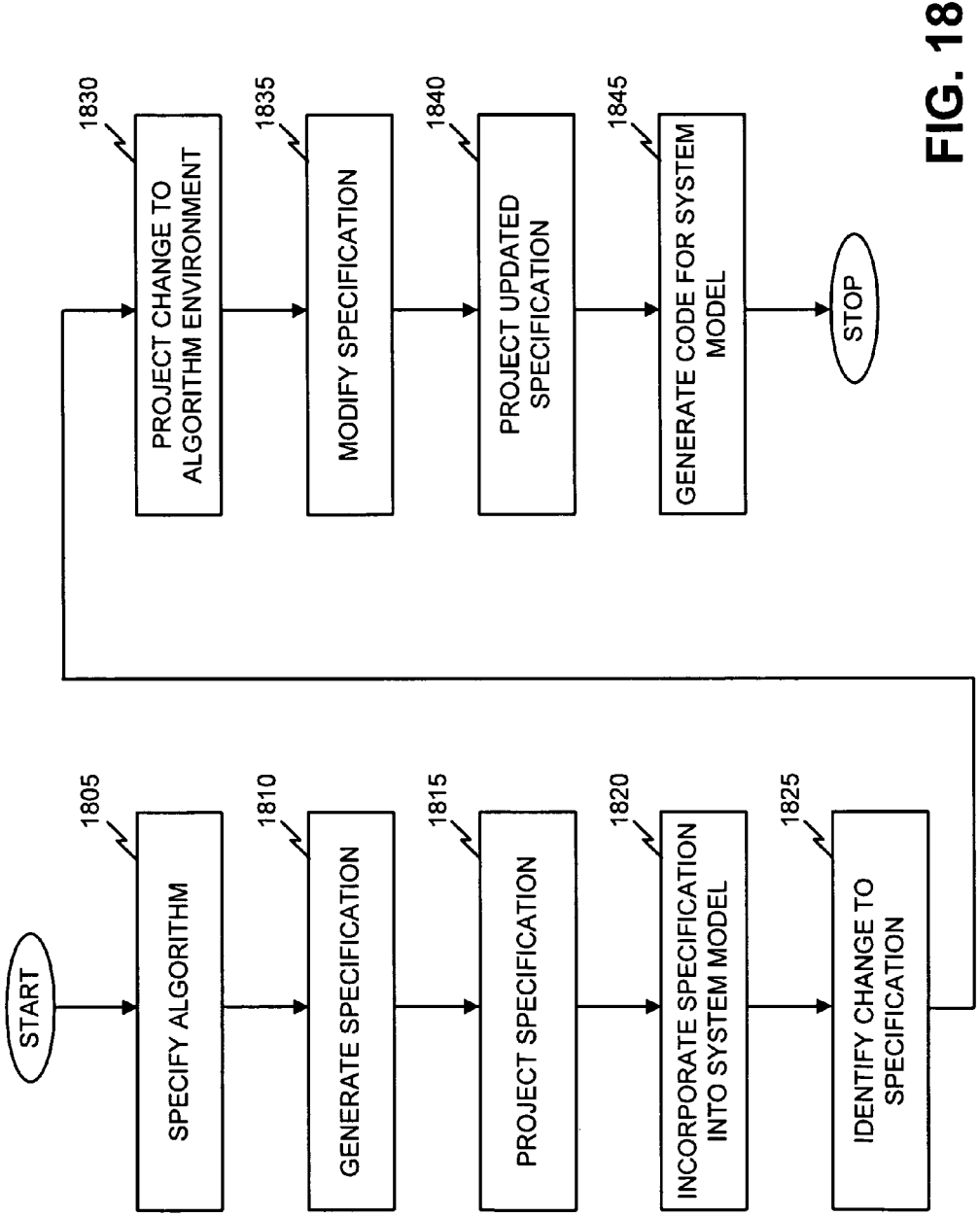

BI-DIRECTIONAL PROJECTION

RELATED APPLICATIONS

This application claims the benefit of U.S. Provisional Patent Applications Nos. 60/944,228 filed Jun. 15, 2007 and 61/060,364 filed Jun. 10, 2008 the contents of which are incorporated herein by reference.

BACKGROUND INFORMATION

System engineers may wish to model systems before building their systems. System modeling may allow these engineers to bring systems to market more quickly and at lower cost than if the systems were prototyped, redesigned, and re-prototyped during system design. These system models may include a number of system components that can include functional capabilities, such as functional capabilities to adjust a temperature setting in a model of a building climate control system. The system components may implement these functional capabilities via algorithms encoded into the system components.

System models may be designed to handle certain tasks well, such as scheduling interactions among the system components. In contrast, there may be other types of tasks for which system models may not be adapted as well, such as, for example, validation and verification, implementation and debugging algorithms that may be used inside system components, etc. Therefore, system engineers may need to get algorithms from other applications that can adequately design, verify and validate algorithms before the algorithms are used in a system model.

System engineers may need to work with someone, such as an algorithm engineer, that can adequately implement and test an algorithm. For example, the algorithm engineer may use an algorithm model to implement and test various algorithms. For example, the algorithm engineer may receive a list of characteristics for an algorithm that receives sensor inputs and produces actuator signals to drive devices that are used in a control system that includes the sensors as input devices. The algorithm engineer may realize the control algorithm using the algorithm model.

The algorithm engineer may provide the algorithm model to the system engineer, and the system engineer may manually rewrite the algorithm model into a format compatible with the system model before the system engineer can use the control algorithm in the system model. If the system engineer determines that something needs to be modified in the algorithm model, the system engineer may need to have the algorithm engineer revise the algorithm model. Then, the system engineer may manually integrate the revised algorithm model into the system model and may re-test the system model.

Manually coding and re-coding algorithm models into system models can be time consuming, prone to human error, and costly. For example, an algorithm engineer may design an algorithm model that implements a set of algorithms used to open and close jaws of a robotic arm used on a stationary robot. The algorithm model may be tested and verified in the algorithm environment and may be given to a system engineer once the algorithm model is verified. The system engineer may manually recode the algorithm model into a portion of a complete system model for the robotic arm. For example, the algorithm model may be used in a system component used to model an arm of the robot, where the arm includes the jaws. The system engineer may determine that the algorithm model needs to be revised and may explain the changes to the algorithm engineer. The algorithm engineer may revise the algorithm model and may retest and re-verify the algorithm model before providing an updated algorithm model to the system engineer. The system engineer may manually enter the updated algorithm model into the system component before modeling the entire stationary robot.

SUMMARY

In an embodiment, one or more computer-readable media holding executable instructions is provided. The instructions may be executed on a processing device to project a specification to a platform environment that includes a system model. The media may hold one or more instructions for accessing an algorithm model, the algorithm model being associated with the specification. The media may further hold one or more instructions for projecting the specification to the system model via a forward projection. The media may further hold one or more instructions for receiving a reverse projection that includes specification changes, the specification changes identifying suggested changes to the specification. The media may still further hold one or more instructions for modifying the algorithm model based on the specification changes, and the media may hold one or more instructions for storing the modified algorithm model.

In another embodiment, one or more computer-readable media holding executable instructions is provided. The instructions may be executed on a processing device to interact with a specification associated with an algorithm environment. The media may hold one or more instructions for receiving an algorithm component from the algorithm environment, the algorithm component related to a specification for an algorithm model that is used in a system model having system components. The media may further hold one or more instructions for identifying modifications to be made to the algorithm component. The media may hold one or more instructions for receiving a modified algorithm component, the modified algorithm component being based on a modified specification produced when the algorithm model is modified in response to the identified modifications. The media may further hold one or more instructions for integrating the modified algorithm component into the system model, the modified algorithm component representing the modified specification in the system model. The integrating may further include one or more instructions for generating an adapter to the modified algorithm component, the adapter encapsulating at least a portion of the modified algorithm component inside a system component and allowing the system component to interact with the modified algorithm component. The media may also hold one or more instructions for storing the system model in storage, or for displaying the system model.

In still another embodiment, one or more computer-readable media holding executable instructions is provided. The instructions may be executed on a processing device to generate code. The media may hold one or more instructions for receiving an algorithm component that represents an algorithm model, the algorithm component being used in a system model that resides in a platform environment. The media may further hold one or more instructions for generating an intermediate representation for the algorithm model. The media may still further hold one or more instructions for associating the intermediate representation with a system component. The media may further hold one or more instructions for generating code for the system component, the generated code including code for the algorithm model, the code for the algorithm model allowing the algorithm model to interact with the system component. The media may hold one or more instructions for storing the generated code in storage, sending the generated code to a destination, or executing the generated code on a target device.

In yet another embodiment, one or more computer-readable media holding executable instructions is provided. The instructions may be executed on a processing device to project information from an algorithm environment to a platform environment. The media may hold one or more instructions for receiving a specification from the algorithm environment, the specification being associated with an algorithm that is represented in an algorithm model. The media may further hold one or more instructions for identifying a system component in the platform environment. The media may still further hold one or more instructions for providing information in the specification to the system component via an algorithm component, the algorithm component representing aspects of the algorithm model in the system model. The media may further hold one or more instructions for receiving a change request from the platform environment. The media may hold one or more instructions for receiving a modified specification from the algorithm environment, the modified specification being produced in response to the change request, the modified specification allowing the algorithm component to communicate with the system model. The media may further hold one or more instructions for storing information about the algorithm environment, information about the platform environment, information about the algorithm model, information about the system model, information about the algorithm, information about the specification, information about the modified specification, information about the algorithm component, information about the system component, or information about an adapter.

In another embodiment, one or more computer-readable media holding executable instructions is provided. The instructions may be executed by a processing device to integrate an algorithm component into a system model, where the algorithm component represents an algorithm model in the system model. The media may hold one or more instructions for identifying the algorithm model, where the algorithm model includes an input port to receive an input signal, an output port to provide an output signal to a destination, one or more algorithms that operate on the input signal to produce the output signal, and one or more internal elements that interact with the input port, the output port or the one or more algorithms when the algorithm model is executed. The media may further hold one or more instructions for identifying one of the one or more of the internal elements, the identifying producing an identified element. The media may further hold one or more instructions for promoting the identified element from being internal to the algorithm model to being external with respect to the algorithm model. The media may further hold one or more instructions for integrating aspects of the algorithm model into the system model using the algorithm component, where the integrating allows the system model to interact with a representation of the input port, a data store memory, a representation of the output port, and a representation of the promoted element when the system model is executed. The media may further hold one or more instructions for storing the system model, or for displaying the system model.

In still another embodiment, a computer-implemented method for interacting with a model is provided. The method may include designing an algorithm model in an algorithm environment, the algorithm model having a specification that includes information about an algorithm implemented in the algorithm model, the specification adapted for projecting to a platform environment. The method may further include revising the algorithm model in response to specification changes received from the platform environment that includes a system component, the system component including an algorithm component that realizes information in the specification within the system component, the platform environment identifying the specification changes based on interactions between the system component and the algorithm component, the revised algorithm having a modified specification that is used to realize a modified algorithm component in the platform environment. The method may still further include displaying the algorithm model or the revised algorithm model using a display device, or storing the algorithm model or the revised algorithm model in a storage device.

In yet another embodiment, a computer-implemented method for interacting with a model is provided. The method may include designing a system component in a platform environment, the system component including an algorithm component derived from a specification received from an algorithm environment, the system component further interacting with the algorithm component when the system component is executed in the platform environment. The method may include modifying the system component by implementing one or more adapters to facilitate interacting between the system component and the algorithm component, or implementing an updated algorithm component in the system component based on information in a modified specification received from the algorithm environment, the changed specification being produced in response to operational characteristics of the system component. The method may include displaying the system component, the algorithm component, or the updated algorithm component, or the method may include storing the system component, the algorithm component, or the updated algorithm component in a storage device.

In still another embodiment, a modeling system that includes projection logic to project a specification from an algorithm environment to a platform environment is provided. The system may include a specification that includes information related to an algorithm model that realizes an algorithm in the algorithm environment. The system may further include a system component that receives the specification from the algorithm environment via the projection logic. The system component can include an algorithm component that represents the information in the platform environment, and an adapter that communicatively couples the algorithm component to the system component. The system can further include processing logic to execute the algorithm model, or to execute the system model. The system may include storage logic to store the algorithm model, store the system model, store the specification, store the system component, store the algorithm component, or store an execution result of the executed algorithm model or the executed system model.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 18 illustrates exemplary processing that can be used to practice an embodiment.

DETAILED DESCRIPTION

Figure 1:
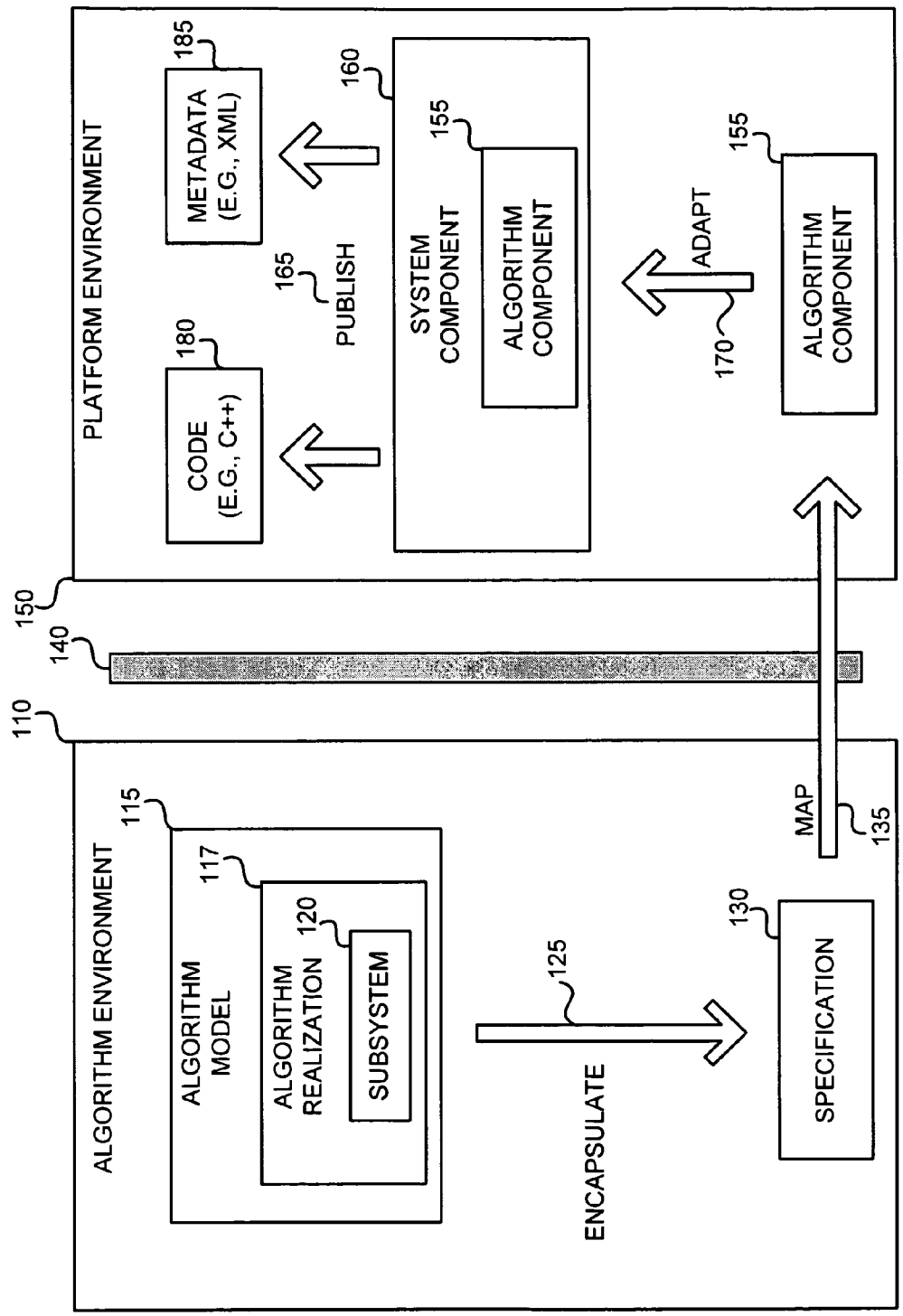
FIG. 1 illustrates an exemplary system for practicing an embodiment.

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Overview

Exemplary embodiments disclosed herein allow information to be projected from an algorithm design environment to an algorithm deployment environment that is used to model a system. For example, an algorithm design environment (hereinafter algorithm environment) may be used to design and test algorithms that can be realized via algorithm models. Once an algorithm is realized in an algorithm model, information about the algorithm can be projected into another environment, such as an environment used to deploy the algorithm in a system.

For example, an algorithm may receive an input from a temperature sensor and may produce an output that is used in a system model that includes a vehicle temperature control system used to adjust the passenger compartment temperature of the vehicle. This algorithm may be modeled in the algorithm environment. Important information or features about the algorithm may be identified and stored in a data structure, such as a specification, and then projected to the algorithm deployment environment (hereinafter platform environment) that can be used to model a platform (e.g., the entire electronic system on the vehicle). For example, the algorithm may be used in a component of the vehicle temperature control system, where the vehicle temperature control system is modeled in the platform environment.

The algorithm and other components of the vehicle temperature control system may be simulated in the platform environment. Based on the simulation, it may be determined that the algorithm should be refined. The platform environment may project information about desired modifications to the algorithm back to the algorithm environment. The algorithm may be revised, verified and validated and then projected back to the platform environment using a modified specification.

Exemplary embodiments may allow code to be generated from the algorithm environment and/or the platform environment for a modeled algorithm or platform component. For example, the algorithm environment can generate code for the algorithm model and can send the code to the platform environment for integration into the platform model. The platform environment can then generate code for the entire platform model, where this generated code includes the code received from the algorithm model. Alternatively, the platform environment can generate code for a portion of the platform model, e.g., a portion of the platform model that does or does not include code received from the algorithm model.

Exemplary embodiments can perform forward projections, reverse projections, code generating activities, and/or testing activities, with, or without, receiving user inputs. Exemplary embodiments can further project a specification from a single algorithm model to a single component in the platform environment, from one algorithm model to multiple components in the platform environment, from multiple algorithm models to a single component in the platform environment, and/or from multiple algorithm models to multiple components in the platform environment.

In addition, exemplary embodiments may allow algorithms and/or generated code to be projected from the algorithm environment into the platform environment as black boxes (i.e., where specific information about the internal workings of the algorithm/generated code is not readily available to the platform environment). Exemplary embodiments may further allow an algorithm environment to project specifications to a variety of platform environment types, and vice versa.

Exemplary System

FIG. 1 illustrates an exemplary system 100 for practicing an embodiment. System 100 may include algorithm environment 110, separator 140, and platform environment 150. The embodiment of FIG. 1 is illustrative and other embodiments may include more components, fewer components, and/or components in arrangements that differ from the arrangement of FIG. 1.

Algorithm environment 110 may include logic that can perform time based, event based, state based, flow based, etc., modeling. Algorithms may be designed and/or modeled based on a set of applicable constraints. For example, constraints may be specified for a time-based model component that includes an algorithm. Algorithm environment 110 may allow the algorithm to be realized using a textual representation and/or a graphical representation (e.g., a block), where the realized algorithm satisfies the constraints.

Embodiments of algorithm environment 110 may allow algorithms to be hierarchically composed and may include tools to facilitate design, testing and deployment of the algorithms. For example, algorithm environment 110 may include optimization tools that optimize algorithms, analysis tools that perform functions such as coverage analysis, verification and validation tools that verify and/or validate algorithms, code generation tools that generate code (e.g., executable code) representing the algorithms, etc.

Boundary 140 may include a physical or logical separation between algorithm environment 110 and platform environment 150. In an embodiment, algorithm environment 110, boundary 140 and platform environment 150 may all reside on a single device. In another embodiment, boundary 140 may include a network that connects a client device running algorithm environment 110 with a remote device (e.g., a server) that runs platform environment 150. In another embodiment, boundary 140 may be an application level interface (API) between algorithm environment 110 and platform environment 150. In still another embodiment, boundary 140 may include a storage media and algorithm environment 110 may store specification 130 in the storage media and platform environment 150 may read the specification from the storage media.

Platform environment 150 may include logic that supports system modeling. For example, platform environment 150 may allow models of physical systems to be specified and realized. For example, a system model can be used to realize one or more system components 160 within the model of the physical system. Embodiments of platform environment 150 may include capabilities, such as adaptation, packaging, implementation, signal logging, event logging, etc., that can be used to facilitate the design of complex hardware and/or software systems.

In one embodiment, platform environment 150 may treat an algorithm received from algorithm environment 110 as an atomic unit, in that the algorithm is not partitioned in platform environment 150. For example, the algorithm may be projected into platform environment 150 as an algorithm component that is considered a single entity within a component of a model in platform environment 150. Platform environment 150 may insert logic, such as a wrapper (e.g., an adapter) around the algorithm to integrate the algorithm into a system model. For example, an adapter may encapsulate the algorithm in the system model. Exemplary embodiments may also support projecting a single algorithm to multiple algorithm components in platform environment 150. Embodiments of platform environment 150 can support processing using one or more processing devices and can perform operations using one or more threads, processes, tasks, etc.

Algorithm environment 110 may include algorithm model 115, algorithm realization 117, subsystem 120, and specification 130. Algorithm model 115 may include a definition of an algorithm and may include a realization of an algorithm (e.g., algorithm realization 117) in algorithm environment 110. In an embodiment, algorithm model 115 may be an executable model. Algorithm realization 117 may include algorithm elements that may interact to perform a function, such as producing a control signal, generating a result, setting a flag, etc. Algorithm elements can be arranged individually, such as an individual model component, or may be grouped together into other functional units, such as subsystem 120. Algorithm realization 117 may include functional algorithm elements and non-functional algorithm elements. For example, a functional algorithm element may affect operation of algorithm model 115, e.g., operating on an input to produce an output, and a non-functional (or parafunctional) algorithm element may not affect operation of the model, e.g., controlling a font style that is used to label the input or the output. In an embodiment, algorithm realization 117 may include one or more subsystems 120.

Subsystem 120 may include a number of algorithm elements having a relationship with each other. For example, a first algorithm element may be represented via a first block and a second algorithm element may be represented via a second block. The two blocks may cooperatively operate to produce a result that is used by another portion of an algorithm model. The two blocks may be grouped into subsystem 120 and may be represented on a display as a single unit, such as a single subsystem block.

Algorithm model 115 may include different types of information, some of which is useful for representing the model in another domain or environment, such as platform environment 150, and some of which is relatively unimportant for representing the model in the other environment. Algorithm model 115 may encapsulate 125 certain information, such as information useful to an environment external to algorithm environment 110, so that the information may be provided to a destination, such as a software application or device.

In an embodiment, algorithm model 115 may use specification 130 to hold information that is useful for representing algorithm model 115 outside algorithm environment 110, e.g., for representing algorithm model 115 in platform environment 150. For example, specification 130 may include a data structure that can be projected from algorithm environment 110 to platform environment 150. Specification 130 may include substantially any type of information that is useful for representing some or all of algorithm model 115 in platform environment 150. For example, specification 130 can include information about features of algorithm model 115, such as ports, data store memories, rate transition buffers, rate groups, signals, numeric ranges, parameters, subsystems, conditional relationships between algorithm elements, etc. In an embodiment, these features may be a collection of algorithm elements that make up algorithm model 115.

Information in specification 130 may be mapped 135, or projected, to an external environment, such as platform environment 150. For example, specification 130 can be mapped across boundary 140, where boundary 140 may separate algorithm environment 110 from platform environment 150. In an embodiment, specification 130 can be mapped to platform environment 150 without performing transformations on information included in specification 130. For example, specification 130 can be mapped into platform environment 150 as an algorithm component 155.

In an embodiment, algorithm component 155 may be a representation of relevant, or useful, aspects of algorithm model 115 in platform environment 150. In an embodiment, algorithm component 155 can be treated as a black box in platform environment 150. Algorithm component 155 can be located in a system component and/or may represent a system component in platform environment 150. Embodiments of algorithm component 155 may be adapted 170 to interact with platform environment 150. For example, algorithm component 155 can be integrated with an adapter to allow algorithm component 155 to interact with system component 160.

System component 160 may be an element of a system that includes a defined interface. In an embodiment, system component 160 may be realized in platform environment 150 using a graphical representation, such as a block. These graphical representations of system component 160 can be built around algorithm components 155. System component 160 may interact with each other using interfaces and may be arranged in subsystems or modules within a system model.

Platform environment 150 may execute a system model that includes one or more system components 160 and may produce a result. Platform environment 150 may further generate code from system component 160, where the generated code can be configured to run on a device. For example, platform environment 150 may publish 165 system component 160 as code 180 (e.g., C, C++, Java, SystemC, hardware description language (HDL), very high speed integrated circuit hardware description language (VHDL), Verilog, etc. code) or as metadata 185 (e.g., extensible markup language (XML), hypertext markup language (HTML), etc.). Code 180 and/or metadata 185 may be configured to run on a device that implements algorithm environment 110 and/or platform environment 150 or may be configured to run on another device, e.g., a target device.

Exemplary Projection Logic

Figure 2:
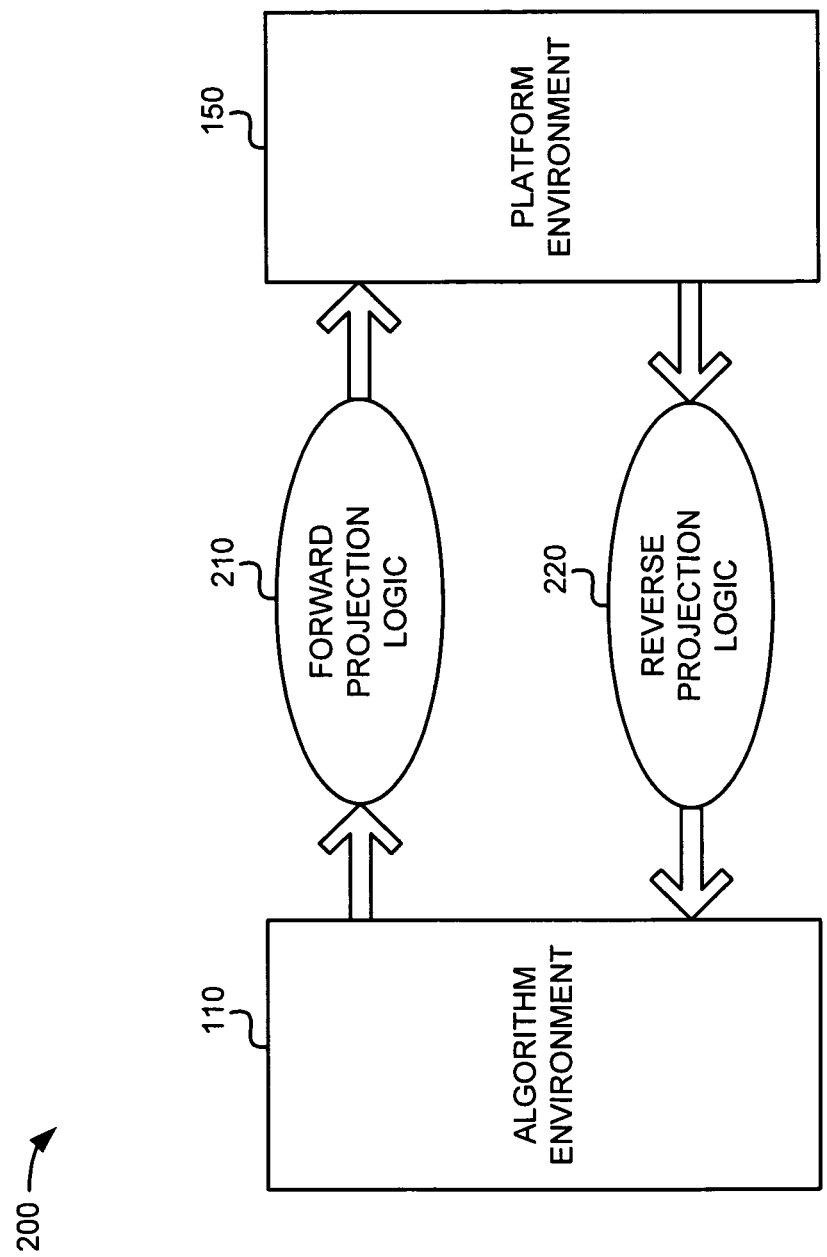
FIG. 2 illustrates an embodiment that includes projection logic for projecting information from one environment to another environment.

FIG. 2 illustrates an embodiment that includes projection logic for projecting information from one environment to another environment. System 200 may include algorithm environment 110, platform environment 150, forward projection logic 210 (hereinafter forward logic 210), and reverse projection logic 220 (hereinafter reverse logic 220). Forward logic 210 may include logic that projects specification 130 from algorithm environment 110 to platform environment 150. In contrast, reverse logic 220 may include logic that projects information about changes, or requests for changes, to a specification from platform environment 150 to algorithm environment 110. Changes to a specification can include additions to, deletions of, and/or modifications to information included in the specification that was projected via forward logic 210.

For example, specification 130 may include information about an input port, an output port, and a reset port associated with an algorithm that is realized via algorithm model 115. When the algorithm is represented using algorithm component 155 and inserted into system component 160, a system engineer may determine that algorithm component 155 will work better if the reset port is moved from an internal location in algorithm component 155 to an external location. For example, the system engineer may not be able to access the reset port if algorithm component 155 is a black box component that includes an internal reset port when it is received at platform environment 150. However, if the reset port is moved to an external location on algorithm component 155 the system engineer may be able to interface a signal directly to the reset port so that algorithm component 155 can be reset by platform environment 150.

The system engineer may use platform environment 150 to send information back to algorithm environment 110 that indicates that an updated specification should be sent, where the updated specification reflects a revised algorithm that includes an external reset port. Algorithm environment 110 may modify algorithm model 115, for example, by changing characteristics of the algorithm model. When algorithm model 115 is modified, algorithm environment 110 may send an updated specification to platform environment 150 via forward logic 210. Platform environment 150 may represent information in the updated specification via an updated algorithm component, where the updated algorithm component includes the external reset port.

Embodiments can include separate forward and reverse projection logic components or a bi-directional projection logic component can be used, where the bi-directional projection logic component includes both forward logic 210 and reverse logic 220. Projection logic can be implemented via hardware and/or software and may reside on a device that runs algorithm environment 110 and/or platform environment 150, or the projection logic can reside on a separate device. For example, projection logic can reside on an intermediate device that sits between a device running algorithm environment 110 and a device running platform environment 150.

Exemplary Workflow

Figure 3:
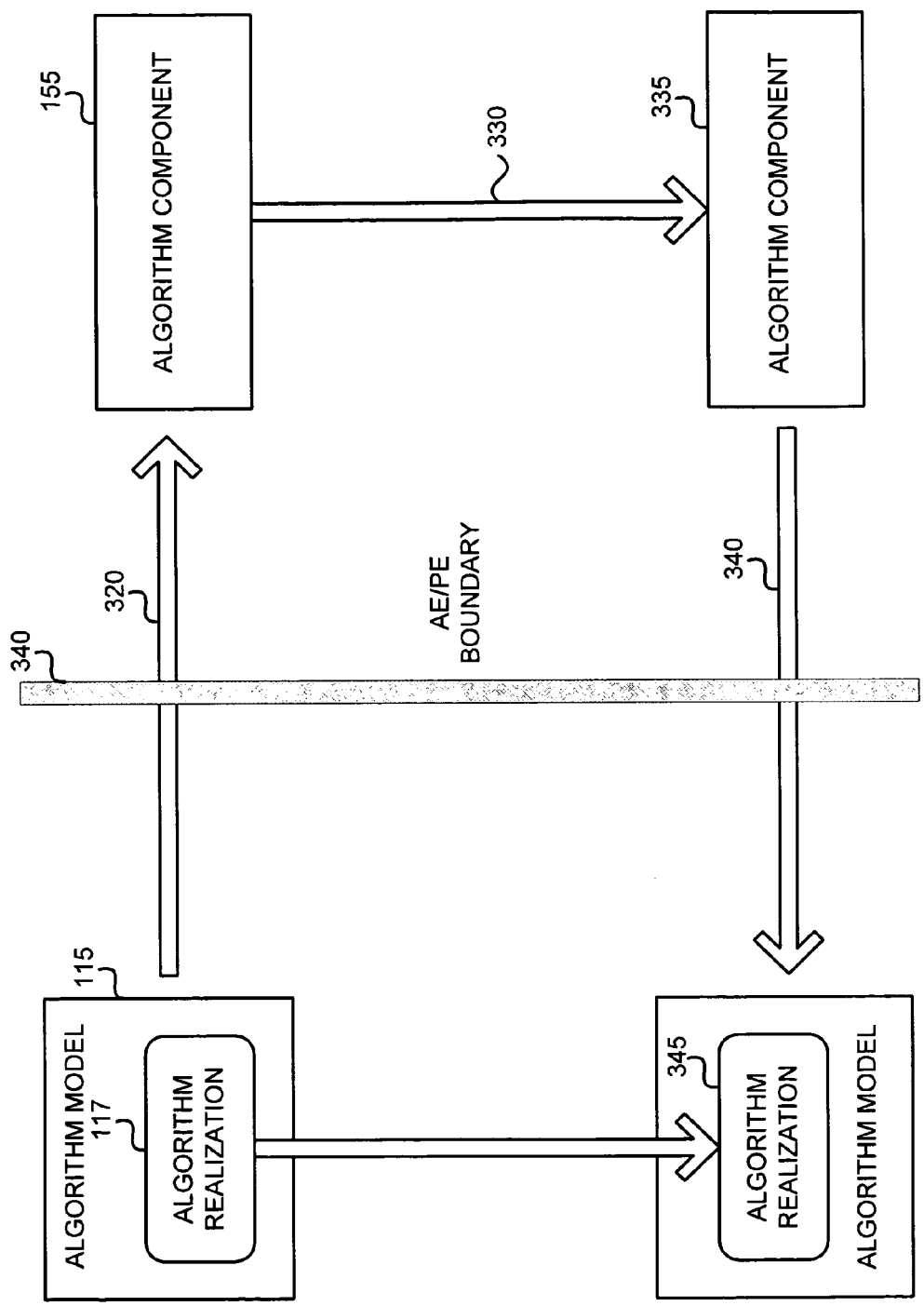
FIG. 3 illustrates an exemplary workflow that can be practiced using an exemplary embodiment.

FIG. 3 illustrates an exemplary workflow that can be achieved using an exemplary embodiment. In FIG. 3, algorithm model 115 can include an algorithm realization 117. Information about algorithm realization 117 can be projected 320 across algorithm environment/platform environment boundary 340 (AE/PE boundary 340) into platform environment 150 as an algorithm component 155. In platform environment 150, algorithm component 155 can be adapted by adding interfaces, ports, registers, error checking logic, etc., to portions of system component 160, algorithm component 155, or other components in a system model.

Platform environment 150 can produce 330 a modified algorithm component 335 that reflects adaptations made to algorithm component 155. Platform environment 150 may send information about modified algorithm component 335 across AE/PE boundary 340 to algorithm model 115, and algorithm model 115 may produce 350 a modified algorithm realization 345 that reflects modified algorithm component 335. Algorithm model 115 can perform testing, verification and/or validation on modified algorithm realization 345. In an embodiment, algorithm model 115 may project modified algorithm realization 345 to platform environment 150 as a modified algorithm component when testing, verification, and/or validation are complete.

Exemplary Bi-Directional Projection

Figure 4:
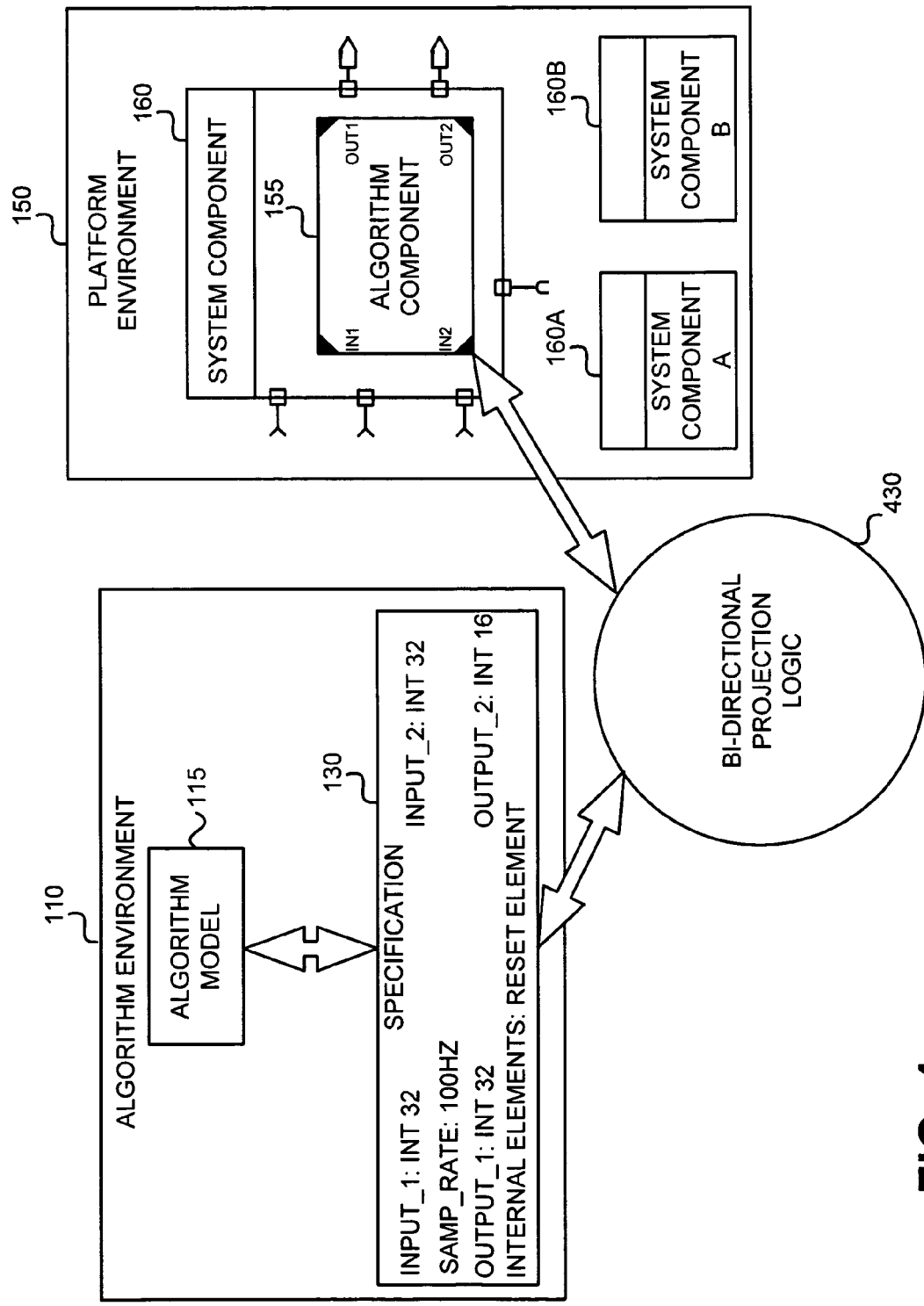
FIG. 4 illustrates an exemplary embodiment that can use a specification to project information related to an algorithm model.

FIG. 4 illustrates an exemplary embodiment that can use a specification to project information related to an algorithm model. The embodiment of FIG. 4 may include algorithm environment 110, algorithm model 115, specification 130, platform environment 150, algorithm component 155, system component 160, 160A and 160B, and bi-directional projection logic 430 (hereinafter bi-directional logic 430).

Specification 130 may include information that can be used by platform environment 150 in a system model. For example, specification 130 may include information about numerical types for inputs and outputs of the algorithm (e.g., INT 32), sample rates used by the algorithm (e.g., 100 Hz), elements internal to the algorithm (e.g., a reset element), etc. Information in specification 130 may be formatted for use by bi-directional logic 430 and may be provided to bi-directional logic 430 for projecting to platform environment 150. In an embodiment, bi-directional logic 430 may project information in specification 130 to platform environment 150 without performing transformations on the information. Platform environment 150 may receive specification 130 from bi-directional logic 430 and may realize the projected information in platform environment 150 via an algorithm component 155.

Platform environment 150 may build one or more system components 160 around algorithm component 155. Platform environment 150 may interface system component 160 to algorithm component 155 and/or platform environment 150 can interface other system components, such as 160A and 160B, to a component that includes algorithm component 155 or directly to algorithm component 155.

Bi-directional logic 430 may also project information about changes to specification 130 from platform environment 150 to algorithm environment 110. For example, in platform environment 150 it may be determined that algorithm model 115 should be modified or replaced (partially or completely) to allow a system modeled via platform environment 150 to perform in a determined manner. By way of example, algorithm model 115 may use fixed point outputs to represent a temperature that can have two digits before the decimal point and two digits after the decimal point (e.g., 27.22 degrees). In platform environment 150, a system model may be unable to allocate a fixed point value for temperature because of storage or bandwidth limitations in the system model. In this situation, platform environment 150 may request that algorithm model 115 be modified to produce outputs that are represented by a smaller data type.

Platform environment 150 may project requested changes back to algorithm environment 110 using bi-directional logic 430. Algorithm environment 110 may modify algorithm model 115 based on the requested changes and may generate a new, or updated, specification 130. Bi-directional logic 430 may project the updated specification to platform environment 150 so that a modified algorithm component can be created and/or inserted into system component 160.

An exemplary embodiment, such as the one illustrated in FIG. 4, may be configured to project specification 130 from a single algorithm model 115 to multiple system components, for example system components 160, 160A and 160B. In one implementation, specification 130 may be the same in system components 160, 160A and 160B. In another implementation, specification 130 may have a first configuration for use with system component 160 and a second configuration for use with system component 160A.

Exemplary Adapter

Figure 5:
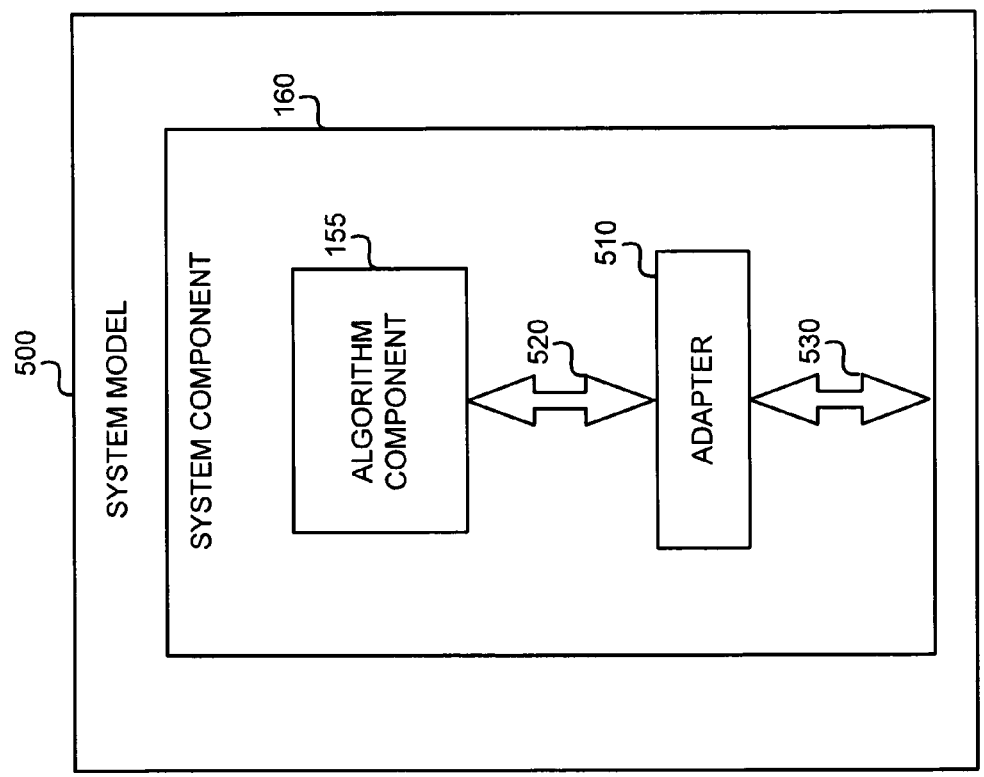
FIG. 5 illustrates an exemplary system component that can include an adapter.

FIG. 5 illustrates an exemplary system component that can include an adapter. Embodiments of system component 160 and algorithm component 155 may include interfaces that allow them to communicate with other components in a system model 500. In some instances, an interface on system component 160 may not be compatible with an interface on algorithm component 155. In these instances, platform environment 150 may add interfacing logic to allow system component 160 to communicate with algorithm component 155.

Exemplary embodiments may use a number of techniques to allow an algorithm component 155 to interact with system component 160. For example, platform environment 150 may use an adapter 510 to interface algorithm component 155 to system component 160. Adapter 510 may include logic to adapt information sent from algorithm component 155 so that the information is in a format compatible with system component 160. Adapter 510 may also adapt information sent from system component 160 so that the information is in a format compatible with algorithm component 155. In an embodiment, adapter 510 may exchange information in a first format 520 between adapter 510 and algorithm component 155, and adapter 510 may exchange information in a second format 530 between adapter 510 and system component 160.

In an embodiment, adapter 510 may be inserted into a system model to handle scheduling on behalf of the algorithm model realized via algorithm component 155, provide signal logging for the algorithm model, provide event logging for the algorithm model, handle data integrity for the system component, etc. Other embodiments of adapter 510 may perform other functions on behalf of algorithm model 115, algorithm component 155, system component 160, or other components in system model 500. For example, adapter 510 may be used to change a numeric type from a first format used with algorithm model 115 to a second type used by system component 160.

Exemplary Projection Logic

Figure 6:
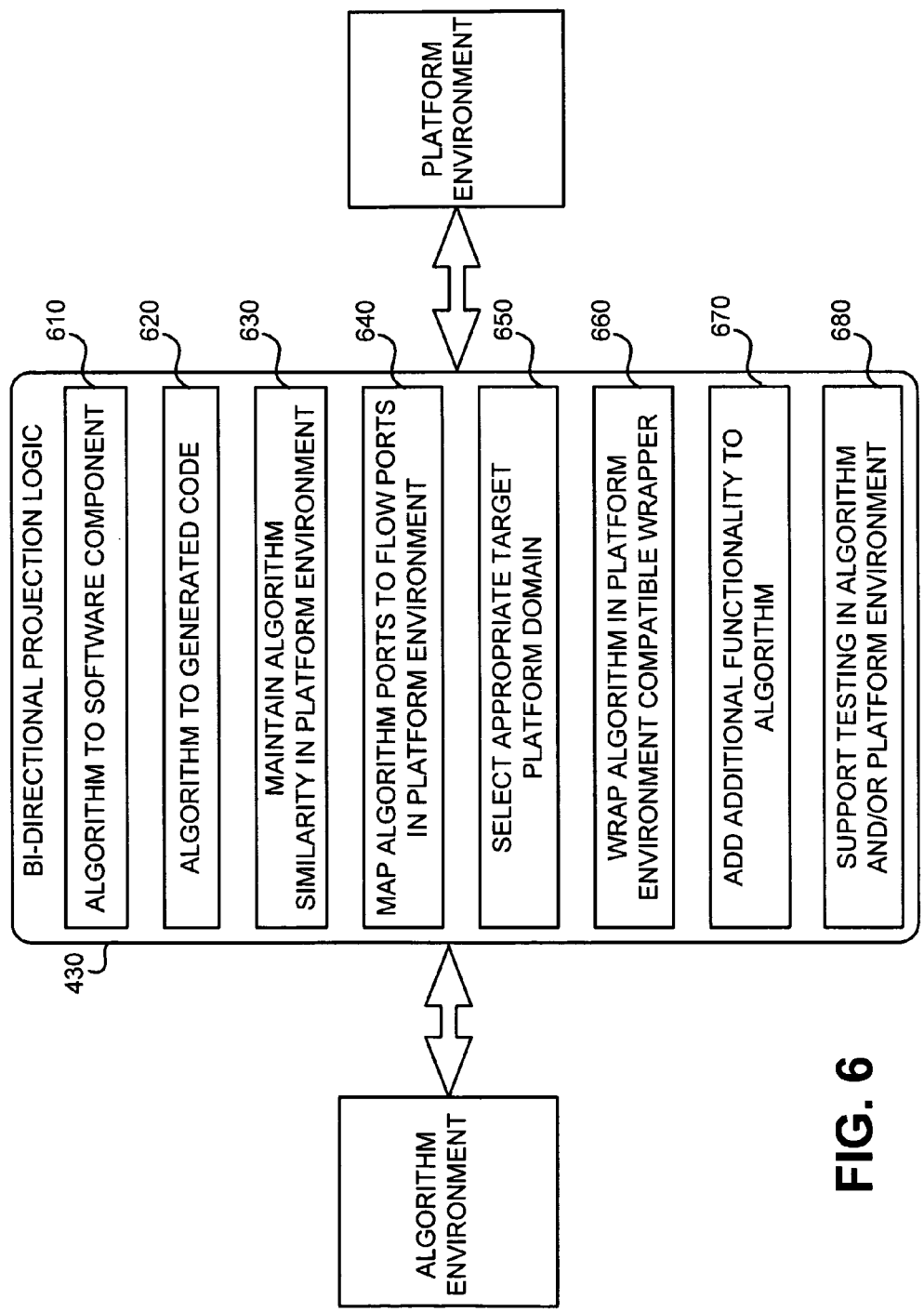
FIG. 6 illustrates examples of information that can be projected from one environment to another environment using bi-directional projection logic.

FIG. 6 illustrates examples of information that can be projected from one environment to another environment using bi-directional logic 430. Bi-directional logic 430 can perform operations that facilitate exchanging information between two environments, such as algorithm environment 110 and platform environment 150. In an embodiment, bi-directional logic 430 can map an algorithm in algorithm environment 110 to a software component 160 in platform environment 150 (block 610). Bi-directional logic 430 may further project an algorithm in algorithm environment 110 to generated code for use in platform environment 150 (block 620). For example, bi-directional logic 430 may project generated code into platform environment 150 as a black box. The black box code can be inserted into system component 160 and executed without requiring that system component 160 have access to information internal to the black box code.

Bi-directional logic 430 may maintain similarity between an algorithm in algorithm environment 110 and a representation of the algorithm in platform environment 150 (block 630). For example, using bi-directional logic 430 may allow information about a realized algorithm to be projected into platform environment 150 without requiring manual intervention (e.g., having a user re-code the algorithm into platform environment 150).

An algorithm in algorithm environment 110 may include ports for receiving or sending information, such as data values, signals, flags, etc. Bi-directional logic 430 may allow algorithm ports to be mapped to ports, such as flow ports, used in platform environment 150 (block 640).

Bi-directional logic 430 can be used to select an appropriate target platform for an algorithm used in algorithm environment 110 (block 650). For example, bi-directional logic 430 can perform modifications on the algorithm when the algorithm is projected so that a realization of the algorithm in the target platform (e.g., the platform receiving the algorithm or a platform that receives the algorithm from platform environment 150) is compatible with the target platform. Bi-directional logic 430 may select an appropriate target platform based on user specified parameters, information known about the algorithm, information known about an intended use of the algorithm, etc.

Bi-directional logic 430 may wrap an algorithm in a platform environment compatible wrapper when projecting the algorithm from algorithm environment 110 to platform environment 150 (block 660). For example, system component 160 may be configured to interact with other components according to a certain interface protocol. An algorithm to be projected to system component 160 may not include inputs or outputs compatible with the interface protocol. Bi-directional logic 430 may wrap the algorithm in a wrapper that makes inputs and/or outputs of the algorithm compatible with the interface protocol used by system component 160. In an embodiment, bi-directional logic 430 may wrap (or encapsulate) a specification for the algorithm in the wrapper and may realize the wrapped specification as an algorithm component 155 in system component 160.

Bi-directional logic 430 may add additional functionality to an algorithm to allow an algorithm to operate in an intended manner in platform environment 150 (block 670). For example, bi-directional logic 430 may add ports, interfaces, buffers, etc., to an algorithm that will be projected to platform environment 150.

Bi-directional logic 430 may include logic that supports testing, such as testing in algorithm environment 110 and/or platform environment 150 (block 680). For example, bi-directional logic 430 may project test procedures, test harnesses, test scripts, etc., from algorithm environment 110 to platform environment 150 so that platform environment 150 can use the projected information to support testing, verification, validation, etc., of the algorithm in platform environment 150.

The operations discussed above in connection with FIG. 6 are exemplary and other implementations of bi-directional logic 430 can perform other types of forward projecting and/or reverse projecting operations.

Exemplary Reverse Projection

Figure 7:
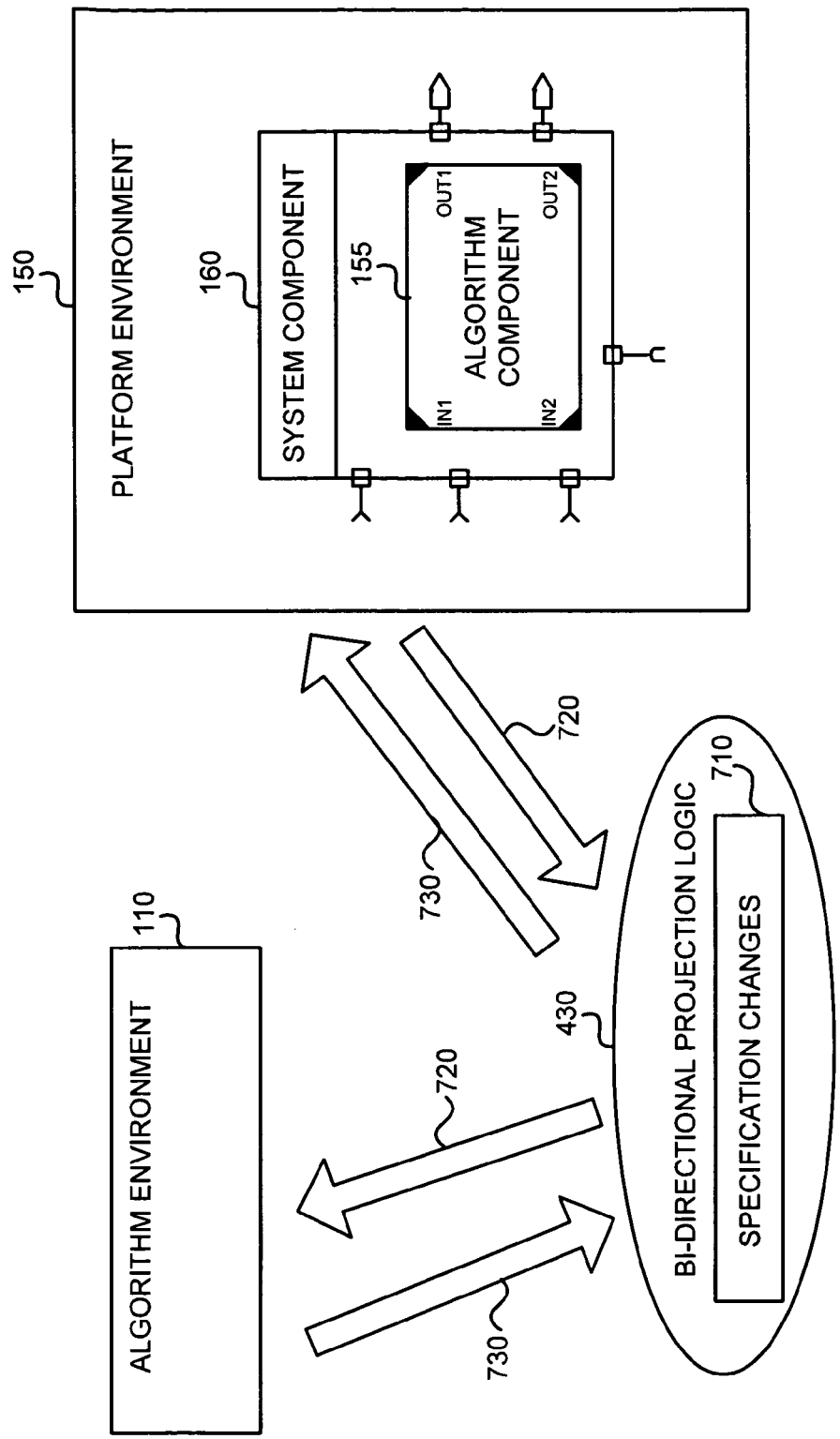
FIG. 7 illustrates a reverse projection from an exemplary platform environment to an exemplary algorithm environment.

FIG. 7 illustrates a reverse projection 720 from an exemplary platform environment to an exemplary algorithm environment. Exemplary embodiments may allow information to be projected from algorithm environment 110 to platform environment 150 via bi-directional logic 430. The projected information may be used in platform environment 150 and, in some instances, it may be determined that the projected information should be modified to allow algorithm component 155 to better function in platform environment 150. For example, an algorithm component 155 may be projected into platform environment 150 via bi-directional logic 430 using a forward projection 730. When system component 160 interacts with algorithm component 155 it may be determined that the interaction can be enhanced by making changes to algorithm component 155.

For example, it may be determined that it is desirable to have system component 160 reset algorithm component 155 at periodic intervals. It may further be determined that augmenting algorithm component 155 with a reset port that is accessible to system component 160 will allow periodic resets to be performed. Since algorithm component 155 may be realized in platform environment 150 as a black box, platform environment 150 may not be able to modify algorithm component 155 since internal workings of algorithm component 155 may not be accessible to platform environment 150.

Continuing with the example, platform environment 150 may request that changes be made to algorithm model 115 in algorithm environment 110. In an embodiment, platform environment 150 may request these changes via specification changes 710. Specification changes 710 may be projected from platform environment 150 to algorithm environment 110 using bi-directional logic 430. For example, specification changes 710 may be sent to algorithm environment 110 via a reverse projection 720. In an embodiment, specification changes 710 may include a data structure that can be projected to algorithm environment 110.

Algorithm environment 110 may interpret specification changes 710 and may make changes to algorithm model 115. For example, in an embodiment, algorithm environment 110 may automatically interpret specification changes 710, or algorithm environment 110 may receive user inputs and may use the user inputs to interpret specification changes 710. Algorithm environment 110 may test the changed algorithm model and may provide a specification for the changed model to bi-directional logic 430 once the changed model is tested. Bi-directional logic 430 may project the changed specification to platform environment 150 for inclusion in system component 160.

Exemplary Algorithm Model

Figure 8:
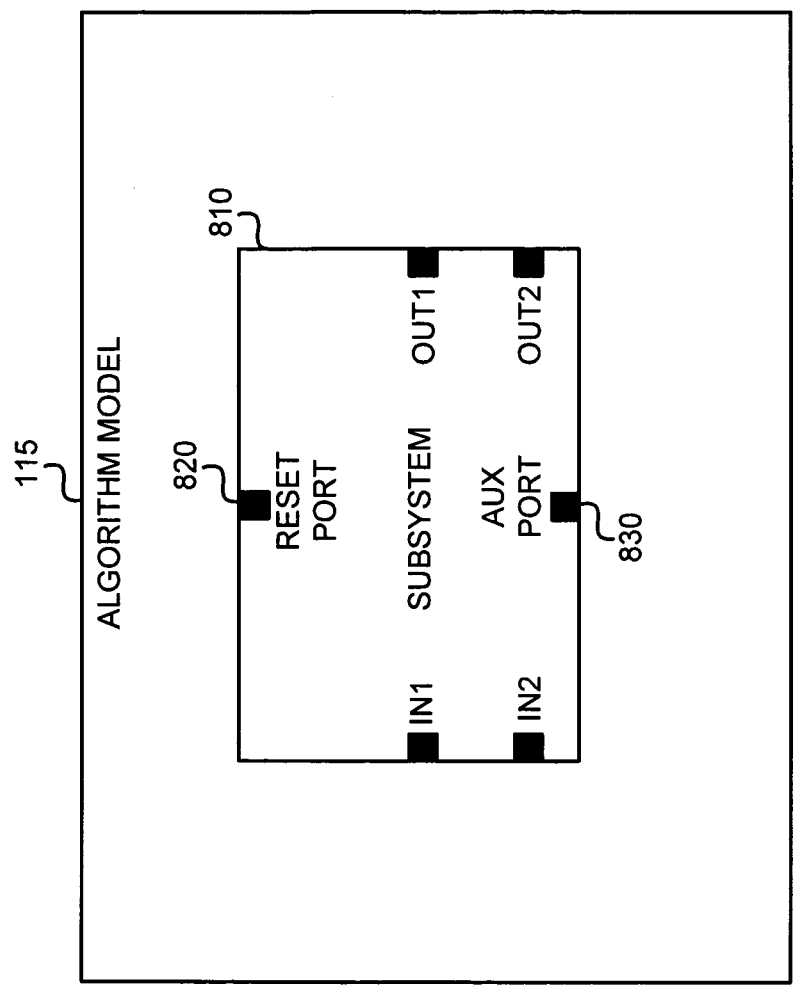
FIG. 8 illustrates an example of an algorithm model that includes a component that is modified based on information in a reverse projection.

FIG. 8 illustrates an example of an algorithm model that includes a component that is modified based on information included in a reverse projection. Information in specification changes 710 can be used by algorithm environment 110 to make changes to algorithm model 115. For example, in FIG. 7 it was determined that system component 160 could benefit from having the ability to reset algorithm component 155. In FIG. 8, algorithm model 115 may modify a subsystem 810 to include a reset port 820 based on information in specification changes 710.

For example, subsystem 810 may not have included a reset port or a reset capability when subsystem 810 was initially projected from algorithm environment 110 to platform environment 150. Algorithm environment 110 may have modified subsystem 810 to include reset port 820 in response to information in specification changes 710. In an embodiment, algorithm environment 110 may further modify subsystem 810 by adding auxiliary port 830. For example, algorithm environment 110 may determine that algorithm model 115 will be more versatile if an auxiliary port 830 is provided to read in reset values for subsystem 810 when a reset signal is applied to reset port 820.

Algorithm environment 110 may test subsystem 810 when reset port 820 and auxiliary port 830 have been added. Algorithm environment 110 may further provide a specification for a tested implementation of subsystem 810 to bi-directional logic 430. Bi-directional logic 430 may project the specification for subsystem 810 to platform environment 150 for inclusion in system component 160. System component 160 may reset an algorithm component 155 representing subsystem 810 via reset port 820 and may provide a reset value to subsystem 810 via auxiliary port 830.

Exemplary Code Generation

Figure 9:
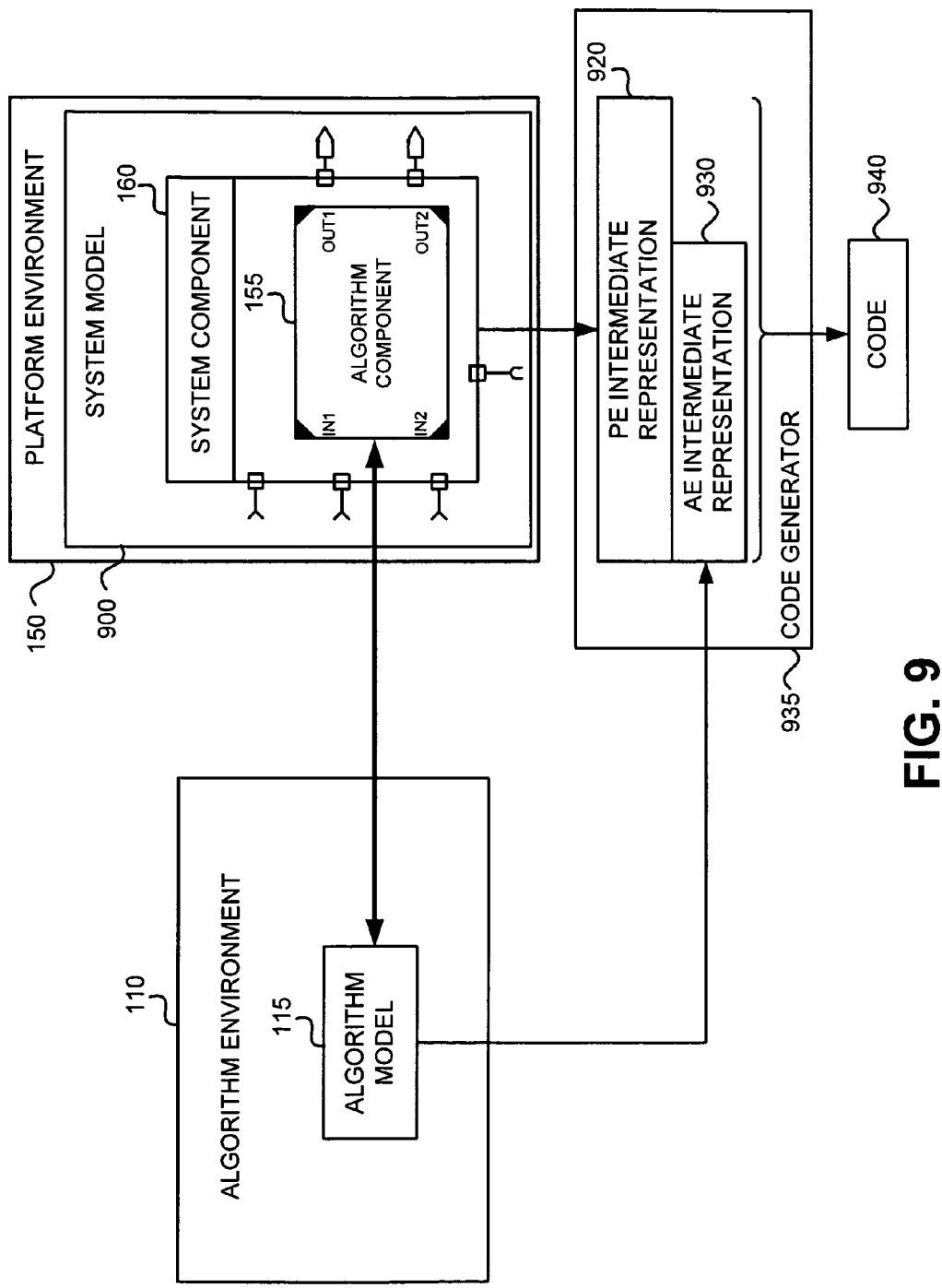
FIG. 9 illustrates an exemplary embodiment that can be used to generate code.

FIG. 9 illustrates an exemplary embodiment that can be used to generate code. For example, a system model 900 in platform environment 150 may represent a control system that will run in a target device, such as an embedded controller. A system engineer may simulate the control system when an algorithm component 155 is projected into system model 900 by bi-directional logic 430. Once the system is tested, the system engineer may wish to generate code for the embedded controller without having to manually convert system model 900 into code of another language, such as code that is in a language that differs from a language in which system model 900 is implemented.

Exemplary embodiments may allow code to be generated from algorithm environment 110 and/or platform environment 150 for components used in algorithm model 115 and/or system model 900. Referring to FIG. 9, algorithm environment 110 may generate specification 130 that can be projected to platform environment 150, where information in specification 130 can be used to represent algorithm model 115 via algorithm component 155. In an embodiment, algorithm component 155 may be treated as a black box in platform environment 150.

When it is desired to generate code for system component 160, platform environment 150 may generate a platform environment intermediate representation 920 (hereinafter PE-IR 920). Algorithm environment 110 can generate algorithm environment intermediate representation 930 (hereinafter AE-IR 930) to represent algorithm model 115. Algorithm environment 110 may send AE-IR 930 to code generator 935. Code generator 935 may combine AE-IR 930 and PE-IR 920 to produce code 940.

Code 940 may be configured such that PE-IR 920 is interfaced to AE-IR 930 to allow generated code 940 to work in a determined manner. For example, PE-IR 920 and AE-IR 930 may interact to perform functions of the control system when executable code for the control system is loaded onto the embedded controller and run. When adapters 510 are used with system component 160 and algorithm component 155, code generator 935 can generate code for adapters 510. The code for the adapters may facilitate interactions between generated code for system component 160 and algorithm component 155. In an embodiment, platform environment 150 can generate an intermediate representation for adapters 510 when the intermediate representation for system component 160 is generated.

Code 940 can include source code, object code, etc., in substantially any language and/or format. Code 940 may be configured to run on a device that executes the models or the generated code can run on a device that is different from a device that executes the models. Code 940 can be generated automatically from models or in response to instructions received on behalf of a user.

Embodiments that support code generation can also optimize intermediate representations or generated code. For example, algorithm environment 110 may optimize AE-IR 930 before projecting it to platform environment 150. The optimized intermediate representation may be used when code is generated for system component 160. Code generator 935 may further optimize code produced from system component 160 and/or algorithm model 115.

Exemplary Verification and Validation

Figure 10:
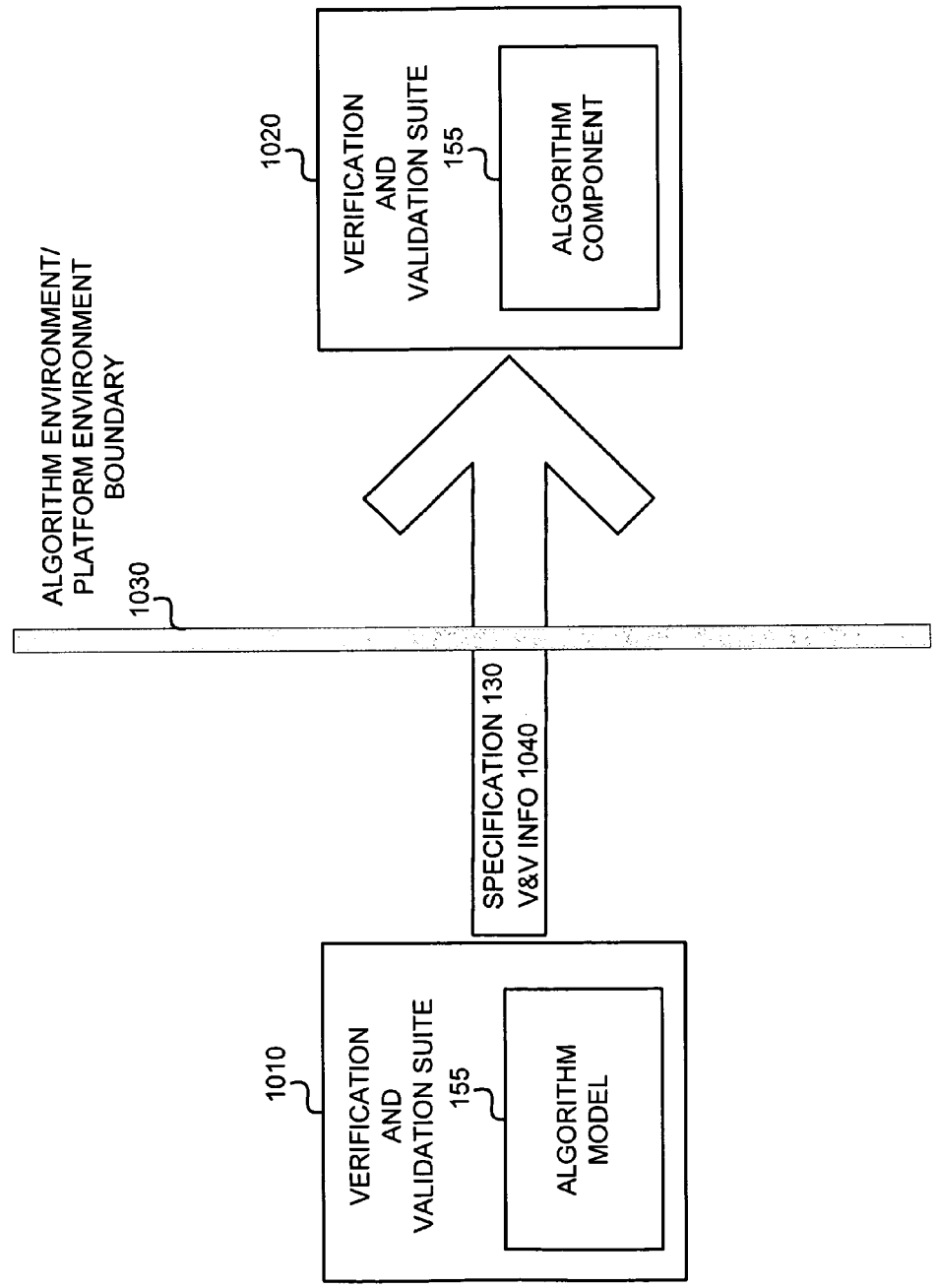
FIG. 10 illustrates an exemplary embodiment that can be used to perform verification and validation of a model.

FIG. 10 illustrates an exemplary embodiment that can be used to perform verification and validation of a model. The embodiment of FIG. 10 may include verification and validation suites 1010 and 1020 (hereinafter V&V suites 1010, 1020) and algorithm environment/platform environment boundary 1030 (hereinafter AE/PE boundary 1030).

Algorithm model 115 may be verified and/or validated once algorithm model 115 is implemented in algorithm environment 110. For example, algorithm model 115 may need to satisfy certain operational and/or safety criteria before algorithm model 115 can be deemed acceptable for use in platform environment 150. In some instances, verification and validation tools adapted for use in algorithm environment 110 may be more robust than verification and validation tools adapted for use in platform environment 150. In these instances V&V suite 1010 may be able to provide more detailed verification and validation results than V&V suite 1020.

Exemplary embodiments may allow verification and validation procedures (e.g., scripts) and/or results to be shared between algorithm environment 110 and platform environment 150. For example, algorithm model 115 may be designed and implemented in algorithm environment 110. An algorithm designer may use V&V suite 1010 to execute scripts that test, verify and/or validate algorithm model 115. For example, V&V suite 1010 may use verification and validation artifacts when performing verification and validation testing. In an embodiment, V&V suite 1010 may include applications Simulink Design Verifier and System Test, by The MathWorks Inc., of Natick Mass.

When test, verification, and validation are completed in algorithm environment 110, information about algorithm model 115 can be projected to platform environment 150 using specification 130 and realized as algorithm component 155. In addition, information about V&V suite 1010 or information produced by V&V suite 1010 can be projected from algorithm environment 110 to platform environment 150, using V&V information 1040, to facilitate testing algorithm component 155 in platform environment 150. For example, V&V suite 1010 can project verification and/or validation artifacts to platform environment 150, where the verification and/validation artifacts may be represented via physical entities in platform environment 150. For example, V&V suite 1010 may use a test harness to test algorithm model 115. When testing of algorithm model 115 is complete in algorithm environment 110, the test harness may be projected to V&V suite 1020 across AE/PE boundary 1030 so that the test harness can be used to test algorithm component 155. In some instances the test harness can require modification before it can be used with V&V suite 1020 and in other instances the test harness may not require modification.

V&V suite 1020 may test algorithm component 155 and other components (e.g., system components) making up a system model in platform environment 150. In an embodiment, platform environment 150 may generate code for a system model when verification and validation results produced by V&V suite 1020 are determined to be acceptable. In an embodiment, V&V suite 1020 may include applications like LDRA, Cantana, T-VEC, etc.

Exemplary embodiments can also be used to perform verification and validation operations on platform environment characteristics within V&V suite 1010. For example, platform environment 150 can project information about platform environment rates, ranges of data values based on storage requirements, jitter associated with rates used in platform environment 150, etc., to algorithm environment 110 and algorithm environment 110 can perform verification and validation operations on the projected information using V&V suite 1010. Verification and validation operations can be performed on both functional and non-functional aspects of information projected from platform environment 150 to algorithm environment 110.

For example, algorithm model 115 may include a number of blocks and switches that connect and disconnect the blocks together. After projecting a specification for the model to platform environment 150, a system engineer may determine that modeling various input to output delays for certain switch configurations of the algorithm model would be helpful. Platform environment 150 can project information about ranges of delays, proposed signal paths, computational cycle limits for an implementation of the model in the platform environment, etc., to algorithm environment 110. V&V suite 1010 can be used to test algorithm model 115 according to information received from platform environment 150. Results of the testing can be projected from algorithm environment 110 to platform environment 150 when testing is completed. In addition, test harnesses and protocols can be sent to platform environment 150 if desired.

Exemplary Sequence Diagram

FIGS. 11A-11D illustrate exemplary sequence diagrams that include operations and interactions performed by an algorithm environment, a platform environment, bi-directional logic, and/or a code generator. In an embodiment, algorithm environment 110, bi-directional logic 430, platform environment 150 and code generator 935 may execute commands and/or may exchange information.

An algorithm may be identified in algorithm environment 110 (act 1102). For example, an algorithm engineer may specify the algorithm based on requirements. A specification may be generated for the algorithm by algorithm environment 110 and/or a user, such as an algorithm engineer (act 1104). The specification may be used to generate an algorithm model to realize the algorithm in algorithm environment 110 (act 1106).

In platform environment 150, a system component may be identified (act 1108) and a specification for the system component may be generated (act 1110). The specification can be used to generate a system component model to realize the system component in platform environment 150 (act 1112).

Platform environment 150 may send a specification request to algorithm environment 110 to request a specification for the algorithm (act 1114). For example, the system component may require the algorithm to perform a function that the system component is expected to perform on behalf of a system model.

Algorithm environment 110 may provide the algorithm specification to bi-directional logic 430 (act 1116). Bi-directional logic 430 may place the algorithm specification into a format that is compatible with platform environment 150 (act 1118). For example, algorithm environment 110 may produce specifications in a format that is not compatible with platform environment 150. Bi-directional logic 430 may convert the specification into a format that can be read by platform environment 150. Bi-directional logic 430 may provide the platform environment compatible specification to platform environment 150 (act 1120).

Platform environment 150 may integrate the received algorithm specification into a system component as an algorithm component (act 1124). Platform environment 150 may represent the algorithm specification via the algorithm component in the system component (act 1126). For example, the algorithm component may be represented as a block that includes ports for receiving inputs and for sending outputs.

In some instances, the algorithm component may not be compatible with the system component. For example, the algorithm component may not be able to exchange information with the system component. In these instances, platform environment 150 can use an adapter to allow information exchanges between the system component and the algorithm component. For example, platform environment 150 may generate an adapter for the system component (act 1128) and may locate the adapter between the system component and the algorithm component. Platform environment 150 may integrate the adapter with the system component to allow information exchanges between the system component and the algorithm component (act 1130). For example, inputs to and outputs from the algorithm component and the system component can be connected to the adapter, respectively.

Figure 11A:
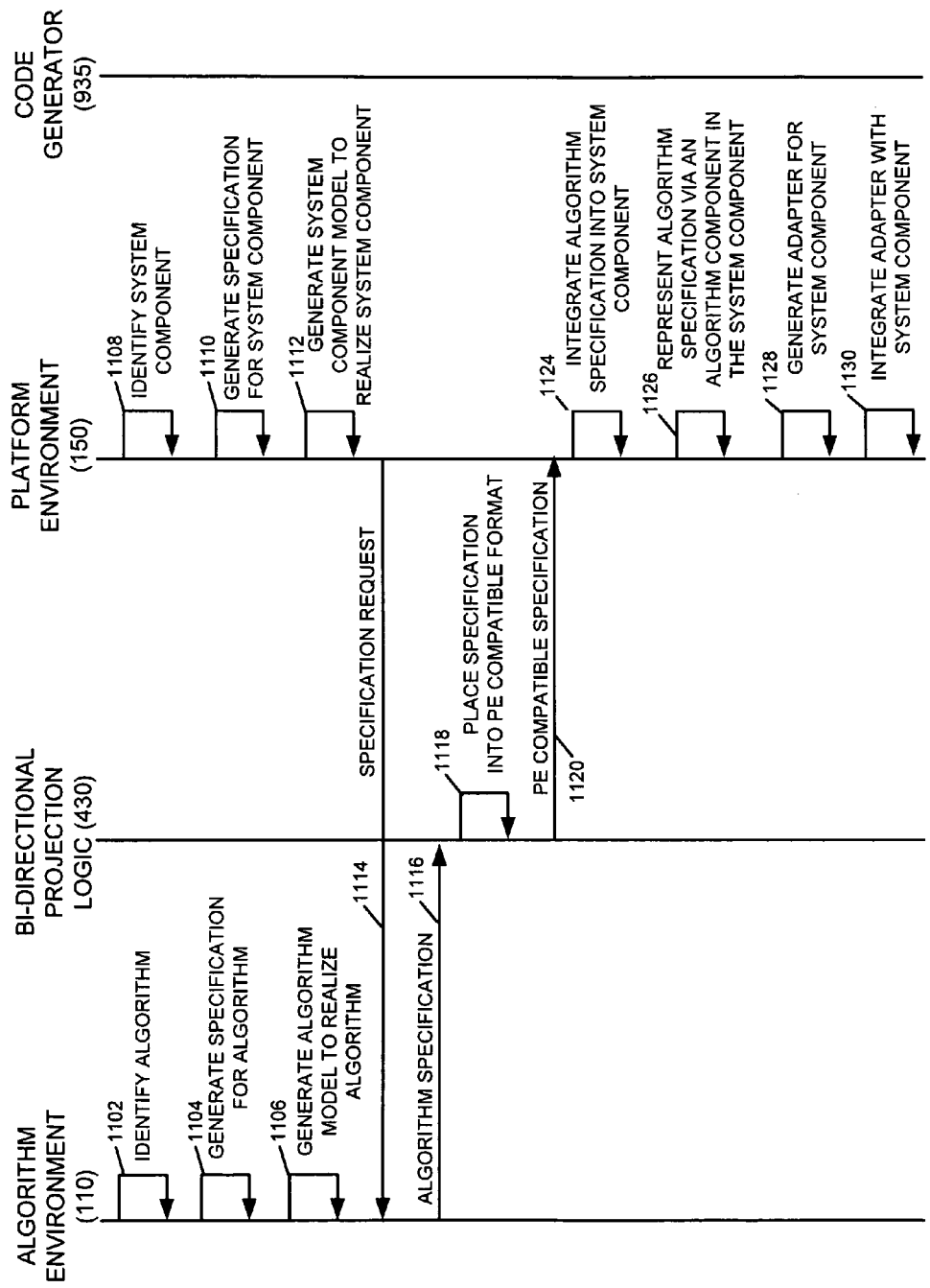
FIGS. 11A-11D illustrate exemplary sequence diagrams that include operations and interactions performed by an algorithm environment, a platform environment, bi-directional projection logic, and/or a code generator.
Figure 11B:
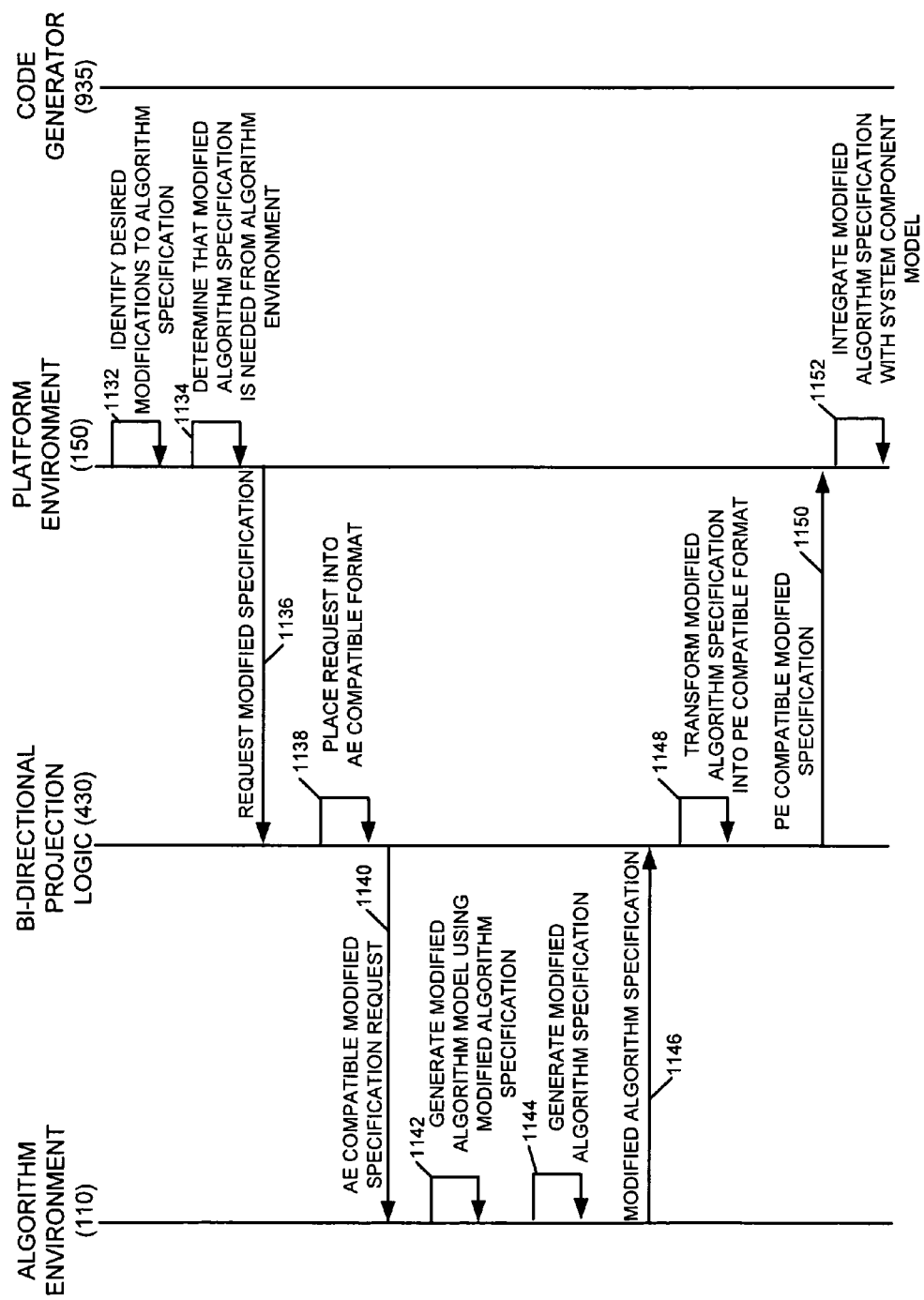

A system engineer may interact with the system component and algorithm component in platform environment 150. For example, the engineer may perform additional design work on a system that includes the system component or the engineer may perform testing on the system. During design and/or testing, desired modifications to the algorithm specification may be determined (act 1132) (FIG. 11B). For example, the engineer may determine that better system performance can be achieved if the algorithm component includes a new port that can be used to monitor a sample rate used in the algorithm component.

Since the monitoring port is not included in the algorithm component currently used in the system component, it may be determined that a modified specification is needed from algorithm environment 110, where the modified specification will include the monitoring port (act 1134). Platform environment 150 may request a modified specification (act 1136). For example, platform environment 150 may provide a request to bi-directional logic 430 and bi-directional logic 430 may convert the request into a format compatible with algorithm environment 110 (act 1138). Bi-directional logic 430 may provide the modified specification request to algorithm environment 110 (act 1140).

Algorithm environment 110 may generate a modified algorithm model based on the modified specification (act 1142) and a modified specification for the modified algorithm model (act 1144). Algorithm environment 110 may provide the modified specification to bi-directional logic 430 (act 1146), and bi-directional logic 430 may place the modified specification into a format compatible with platform environment 150 (act 1148). The modified specification may be provided from bi-directional logic 430 to platform environment 150 (act 1150) and platform environment 150 may integrate the modified specification with the system component using a modified algorithm component that includes the monitoring port (act 1152).

Figure 11C:
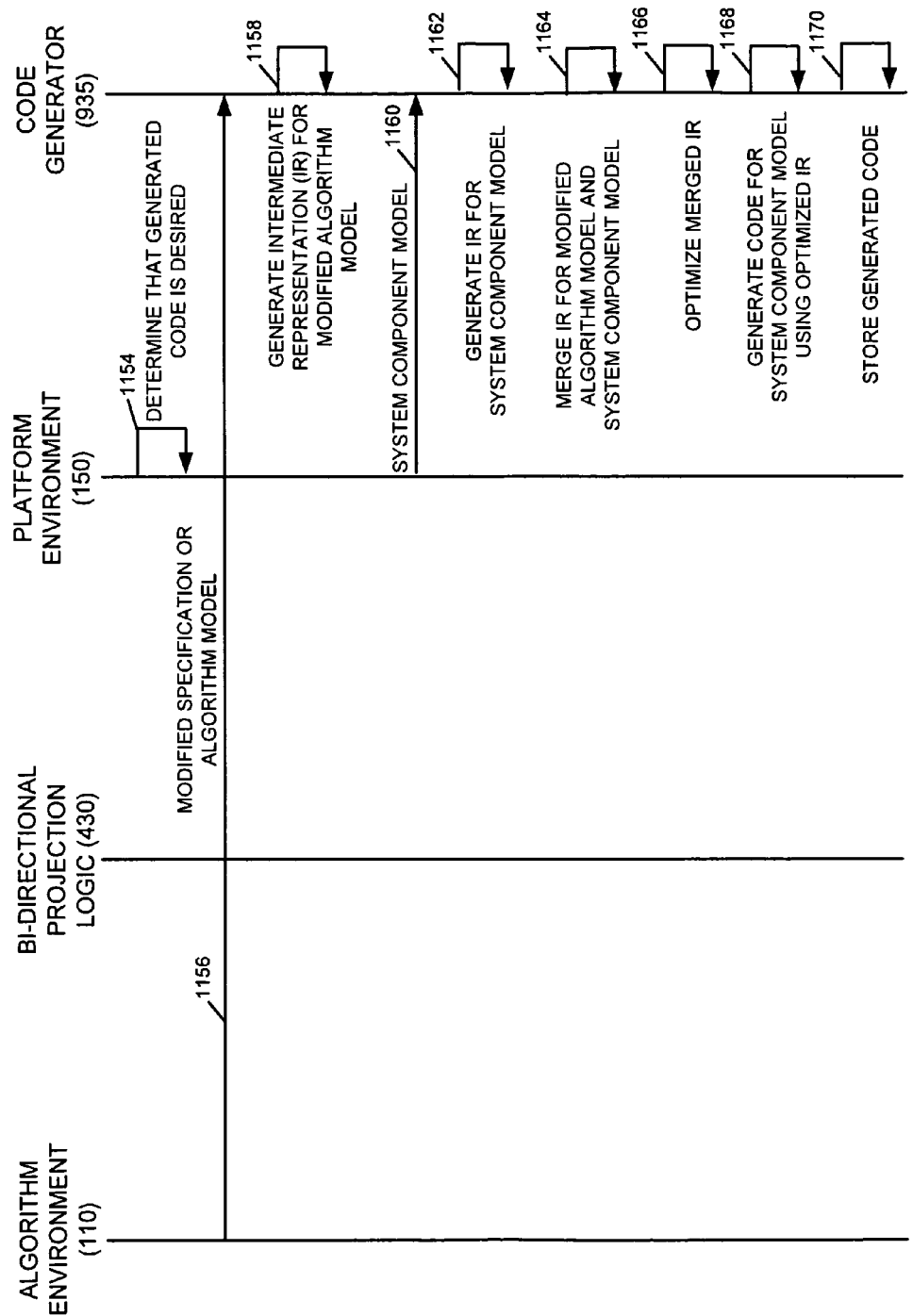
Figure 11D:
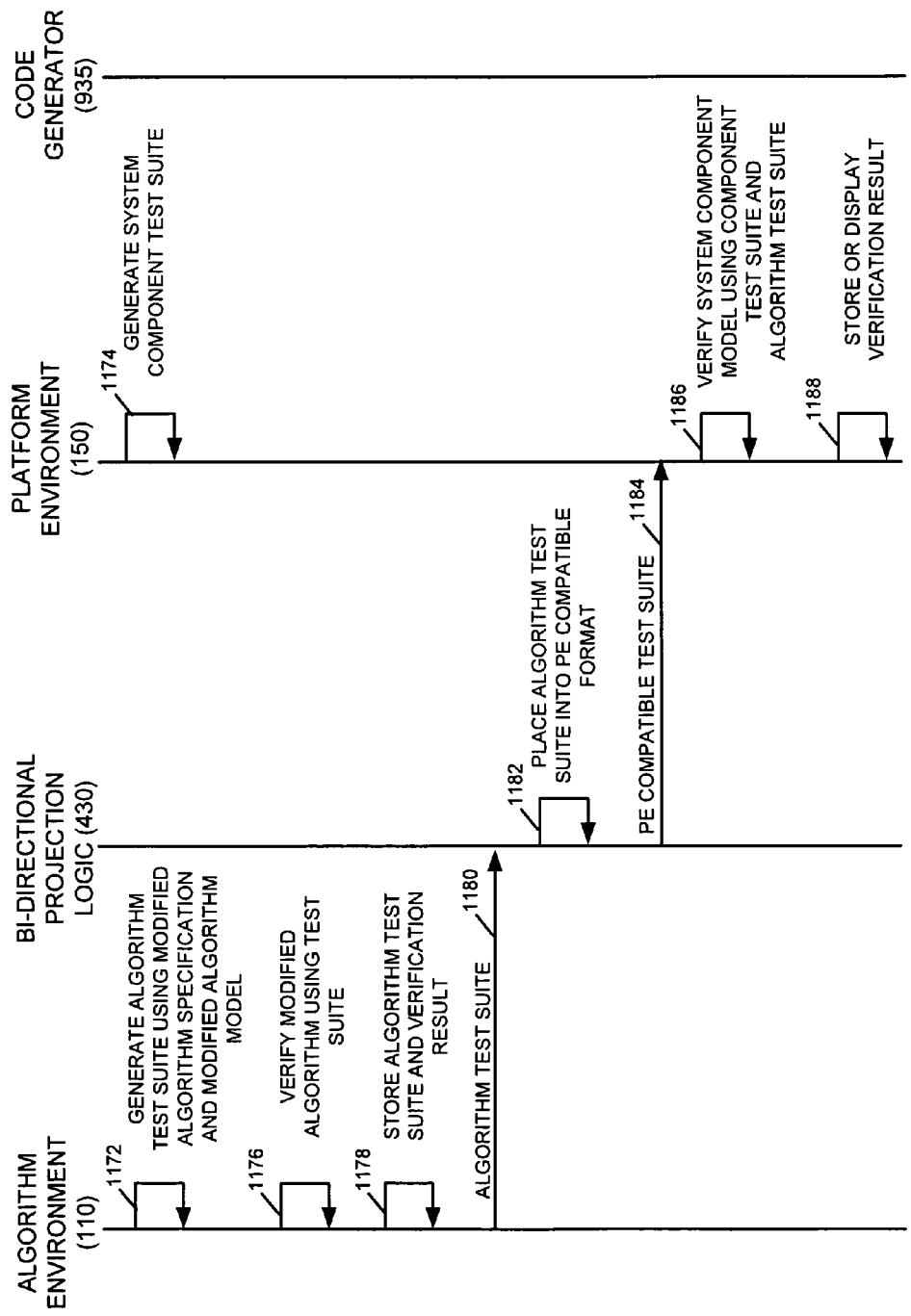

A system engineer may work with a system model that includes the system component containing the modified algorithm component and may determine that the system model is acceptable. Since the system model is acceptable, it may be determined that code should be generated for the system component that includes the modified algorithm component (act 1154) (FIG. 11C).

When code is to be generated, code generator 935 may receive a modified specification and/or the modified algorithm model from algorithm environment 110 when modifications have been made to algorithm model 115 (act 1156). Code generator 935 may generate an intermediate representation for the modified algorithm model (act 1158), where the intermediate representation includes information that is used to implement the functional behavior of the modified algorithm in a target environment. In an alternative embodiment, algorithm environment 110 may provide an intermediate representation for the modified algorithm model or the modified specification to code generator 935 and/or platform environment 150. In situations where an initial version of algorithm model 115 is acceptable for use in system component 160, code generator 935 may generate code from the initial algorithm model 115 instead of from a modified version of algorithm model 115.

Platform environment 150 may provide a specification for the system component or may provide the system component itself to code generator 935 (act 1160). Code generator 935 may generate an intermediate representation for the system component (act 1162). Code generator 935 may merge the intermediate representation for the modified algorithm component with the intermediate representation for the system component (act 1164). Merging the two intermediate representations may combine the functional behavior for the modified algorithm component with the system component to provide the functionality of the system model.

Code generator 935 may optimize the merged intermediate representations to improve performance, reduce memory requirements, etc. (act 1166). Code generator 935 may then generate code for the system component and for the algorithm component (act 1168). For example, code may be generated for the system component with the algorithm component represented inside the system component as a black box. In addition, code may be generated for adapters used with the algorithm component and with the system component. Generated code may be stored in a storage device for later use (act 1170).

Exemplary embodiments may be configured to test algorithm models and/or system models so that model designs can be verified and/or validated. For example, referring to FIG. 11D, an algorithm test suite may be generated using the modified algorithm specification and/or modified algorithm model (act 1172). In an embodiment, a specification may include information that is important to the functional behavior of an algorithm. This information may be used to identify test procedures that are useful for testing the algorithm. The test procedures may be embodied in a test suite that can be used to perform testing on the algorithm. A system component test suite may also be generated on platform environment 150 (act 1174). For example, the system test suite may test components that use the algorithm (e.g., a system component).

The modified algorithm may be verified using the test suite (act 1176) and results of the verification may be stored in a storage device (act 1178). Algorithm environment 110 may provide the test suite to bi-directional logic 430 (1180) and bi-directional logic 430 may place the algorithm test suite into a format compatible with platform environment 150 (act 1182). Bi-directional logic 430 may provide the algorithm test suite to platform environment 150 in a format compatible with platform environment 150 (act 1184).

The system component that includes the algorithm component may be tested and/or verified using the system component test suite and the algorithm test suite (act 1186). When testing and verification is finished, results may be displayed via a display device or stored in a storage device (act 1188). Results may further be provided to a destination device if desired.

Exemplary Environments

Embodiments of the invention can be deployed using a variety of algorithm environments 110 and platform environments 150. For example, algorithm environment 110 can be implemented in Simulink and/or via another application having similar capabilities. Platform environment 150 may also be implemented in a variety of ways. For example, platform environment 150 may be implemented via an environment that uses the Unified Modeling Language™ (UML), which is under the control of the Object Management Group (OMG), UML Profile for Modeling and Analysis of Real-Time and Embedded Systems (MARTE), the System Modeling Language (SysML), SystemC, Architecture Analysis and Design Language (AADL), Software Communications Architecture (SCA), Automotive Open System Architecture (AUTOSAR), etc.

Exemplary embodiments can be used for bottom up designs and/or for top down designs. In a bottom up design, an algorithm model may exist and it may be desired to use or reuse the algorithm model in a system design, such as a design for a software system modeled using, for example, UML. In contrast, in top down design a system model may exist and may require a component that fits into an architecture for the system model. In some instances, a top down specification for a component may differ from a shape or functional characteristic of an algorithm model that will be represented in the system model via an algorithm component. Logic, such as adapters, interfaces, etc., may be required to fit the algorithm component into the system model.

An example will be described herein that illustrates projecting an algorithm model developed in Simulink to a platform environment that uses AUTOSAR. In the example, the algorithm model relates to a climate control system for a vehicle. This example is illustrative and is not intended to be limiting.

Example

FIGS. 12-16 illustrate an example of a climate control system that can be realized using an exemplary embodiment.

Figure 12:
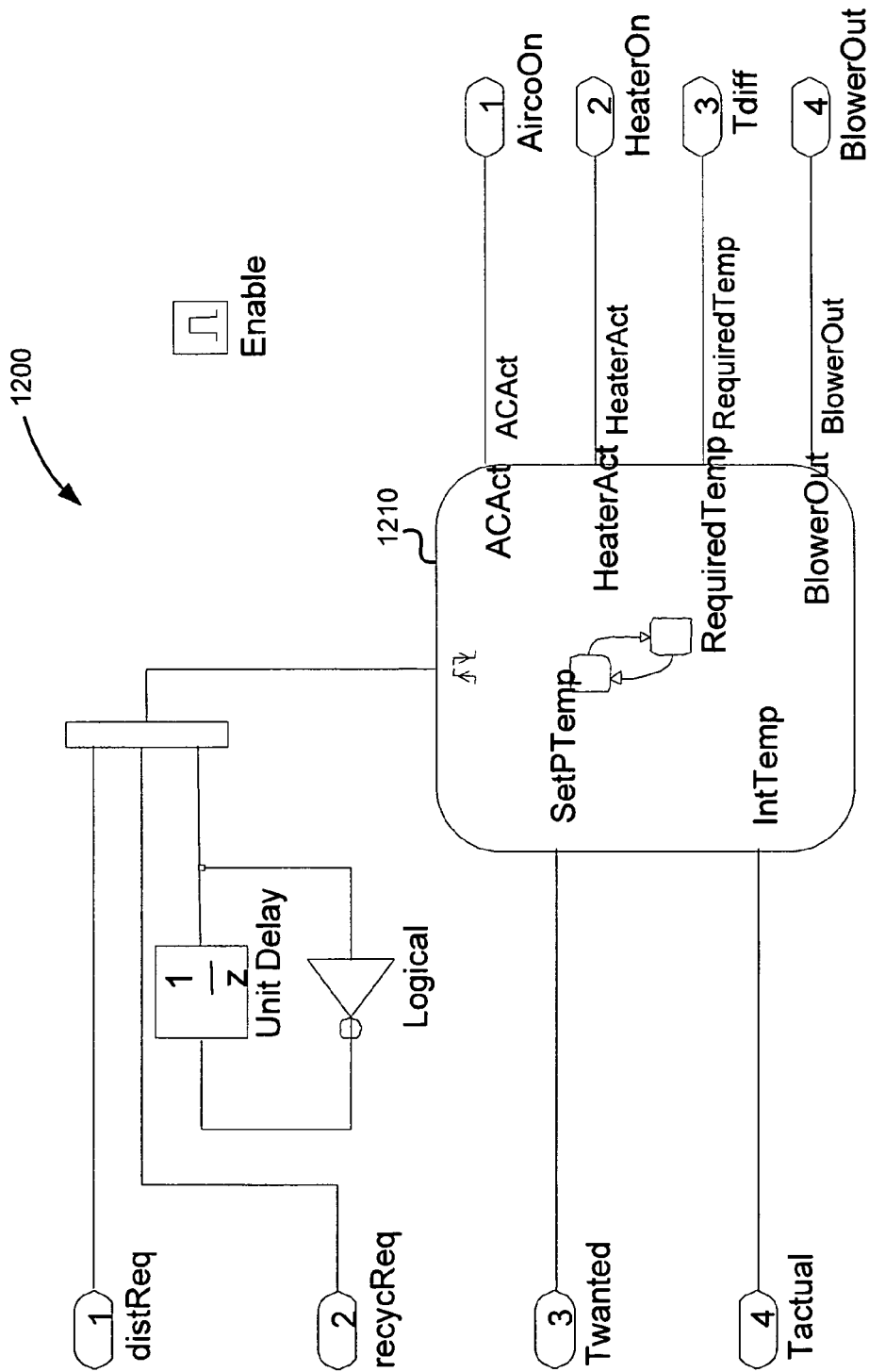
FIGS. 12-16 illustrate an example of a climate control system that can be realized using an exemplary embodiment.

Referring to FIG. 12, a model 1200 is implemented in Simulink, where model 1200 includes a climate control algorithm. Model 1200 may use a desired temperature (Twanted), a current temperature (Tactual), a recirculation on/off signal (recycReq), and an airconditioner (a/c) on/off signal (disbled) tReq). Algorithm 1210 accepts these signals and may generate one or more actuator signals that can act as outputs of the algorithm. For example, algorithm 1210 can realize equations that generate a condenser command value (ACAct), a heater fan command value (HeaterAct), a heating element temperature command value (RequiredTemp), or a blower command value (BlowerOut).

An algorithm model, such as the one illustrated in FIG. 12, can be used by itself or it can be used in a larger algorithm model. For example, algorithm model 1200 may be used as a subsystem within a larger algorithm model. In one embodiment, algorithm model 1200 may represent an algorithm that includes one or more other algorithms, such as algorithm 1210.

Figure 13:
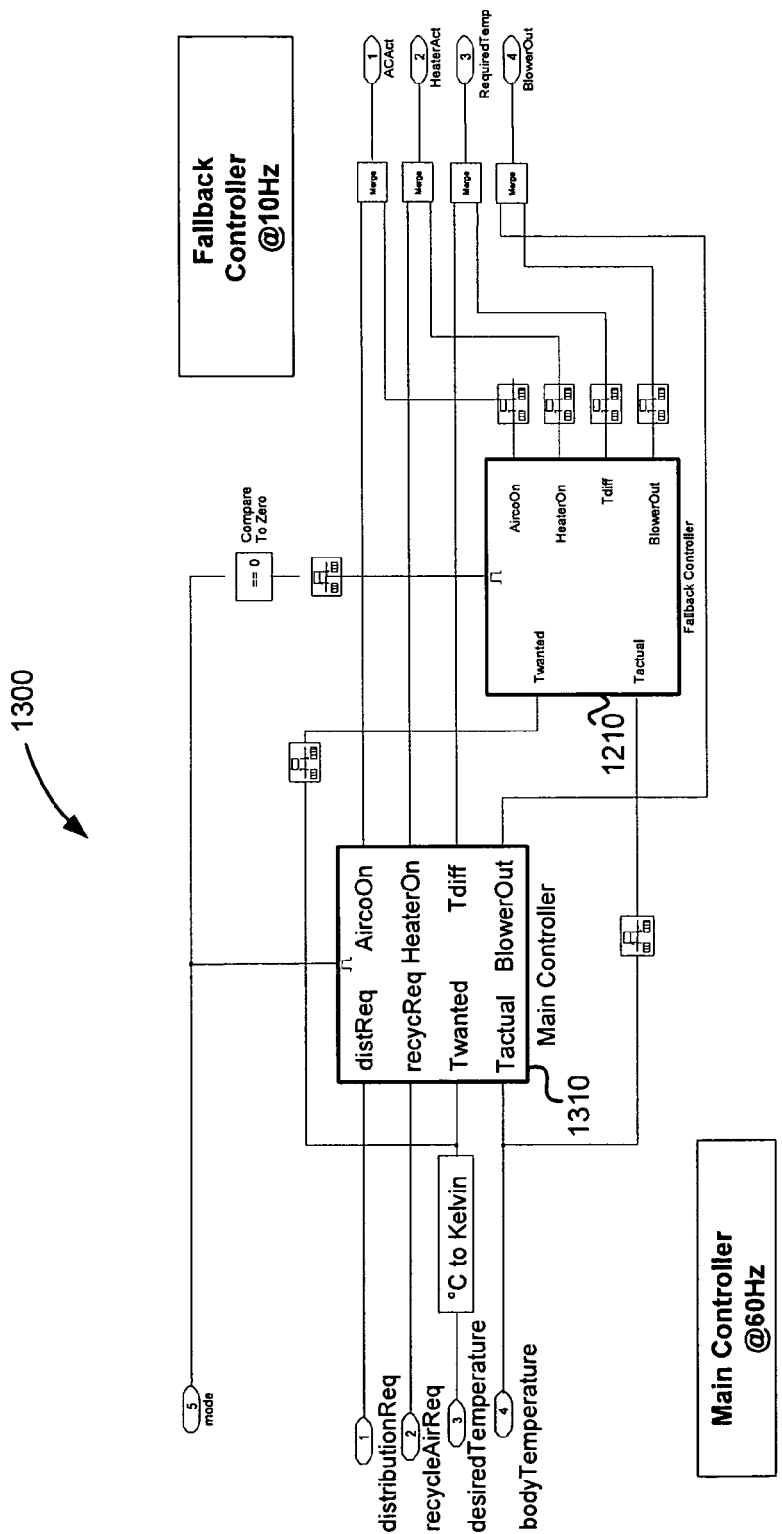

Referring to FIG. 13, model 1200 can be reused as part of a larger algorithm model 1300. Here algorithm model 1300 can include two climate control algorithms, where one algorithm (1310) may apply to a normal operational scenario and the other algorithm (1210) may apply to a degraded operational scenario. For example, a normal, or standard, rate of execution for a climate control algorithm may be 60 Hz and may control temperature to within ±2° C. In some instances a sample rate of 60 Hz may not be possible due to, for example, a malfunction. In these instances a degraded mode of operation may be used where the degraded operating mode may run at 10 Hz and may only control temperature to within ±5° C.

In an embodiment, it may be desirable to represent model 1300 in another domain, or environment, such as a platform environment 150 to facilitate design of a system. Bi-directional logic 430 may project a specification for model 1300 into platform environment 150 in a form suitable for modeling the system. In one embodiment, model 1300 may be verified and/or validated prior to projecting a specification for model 1300 to platform environment 150.

In some embodiments, it may be desirable to maintain as much similarity as possible between the representation of model 1300 in Simulink and the representation of model 1300 in platform environment 150. For example, it may be desirable to maintain port mappings between the Simulink representation of model 1300 and the platform environment 150 representation of model 1300. In other instances, maintaining a mapping between canonical input and output ports in a Simulink representation of model 1300 may be desirable. In other instances, maintaining similarity between the two environments may not matter.

Figure 14:
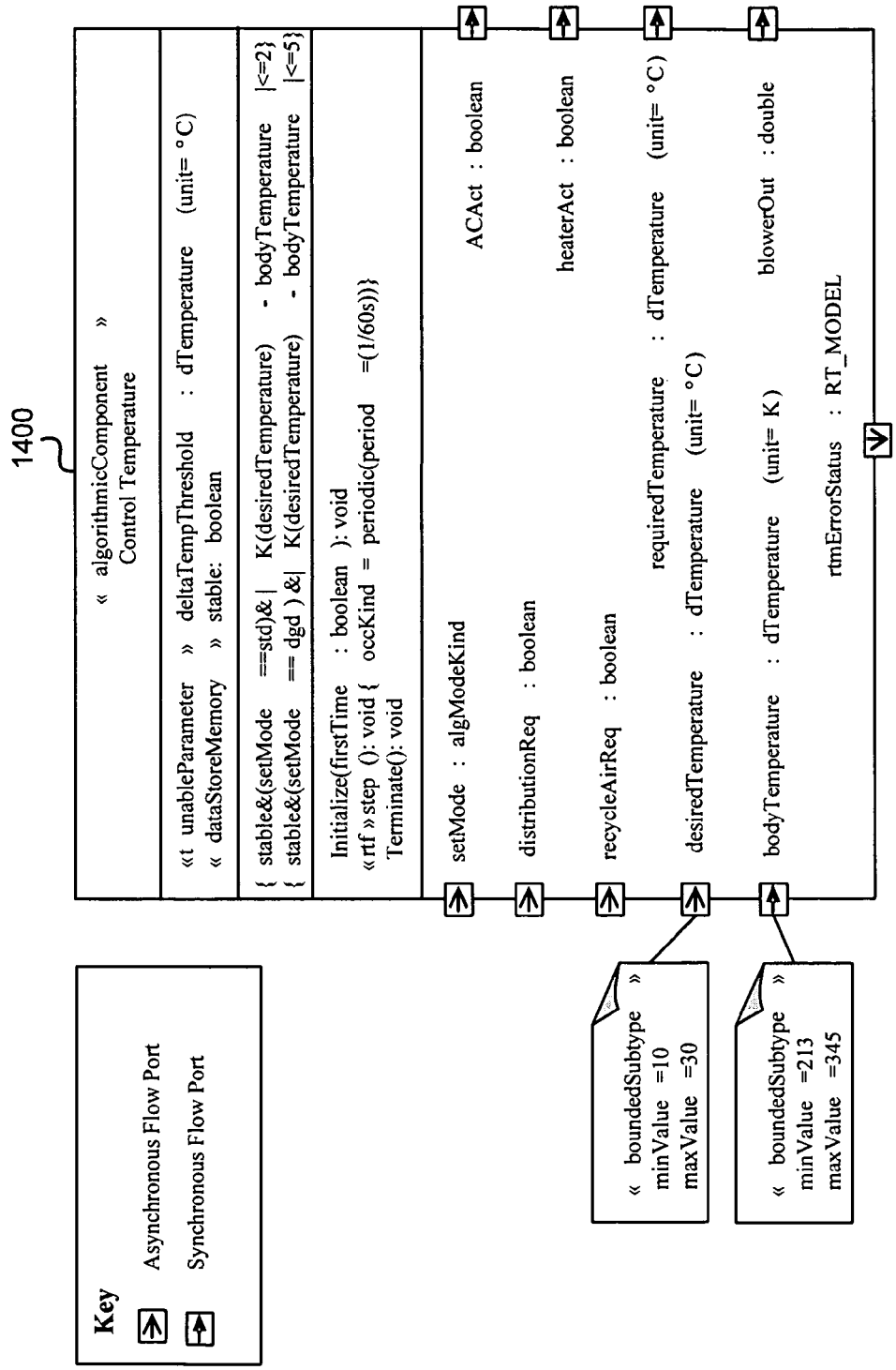

Referring to FIG. 14, model 1300 can be projected from Simulink to platform environment 150 where platform environment 150 is a UML-based environment that uses MARTE notations. In FIG. 14, model 1300 is represented in UML as algorithm component 1400. Bi-directional logic 430 may map the Simulink ports from model 1300 to MARTE flow ports in algorithm component 1400.

In FIG. 14, a distinction may be drawn between ports that require information provided at a rate that matches a rate of the algorithm in algorithm component 1400 (e.g., referred to as synchronous ports) and ports that do not require information at a rate that matches a rate of the algorithm (e.g., ports that can receive information on an as needed or available basis) (e.g., referred to as asynchronous ports). Ports in algorithm component 1400 may also include information about units for information flowing into or out of the ports, bounds for the ports (e.g., upper bounds, lower bounds, etc.). In FIG. 14, for example, the body temperature is provided in Kelvin and the desired temperature in Celsius.

Algorithm component 1400 may also include other information such as time-dependent information for algorithms running in algorithm component 1400. For example, the MARTE notation of algorithm component 1400 may include an <<rtf>> label that is used to store details of the algorithm's period. For example, algorithm component 1400 may expose one rate and may schedule two different rates internally. If desired, algorithm component 1400 can be modified to expose a feature (e.g., a port) for each rate running in algorithm component 1400 to allow a system engineer to handle scheduling for algorithm component 1400 in platform environment 150.

In FIG. 14, algorithm component 1400 can include information that captures additional constraints on the component. For example, a designer of the algorithm can define a contract that algorithm component 1400 offers. For example, if the 60 Hz regulation is running (standard mode) then in a stable state the body temperature will be within 2 degrees of the desired temperature. In contrast, when running at 10 Hz (degraded mode) the body temperature may only be within 5 degrees.

The algorithm component 1400 may be represented in other notations, such as AUTOSAR within platform environment 150. For example, the temperature controller can be represented as an atomic software component in AUTOSAR.

Figure 15:
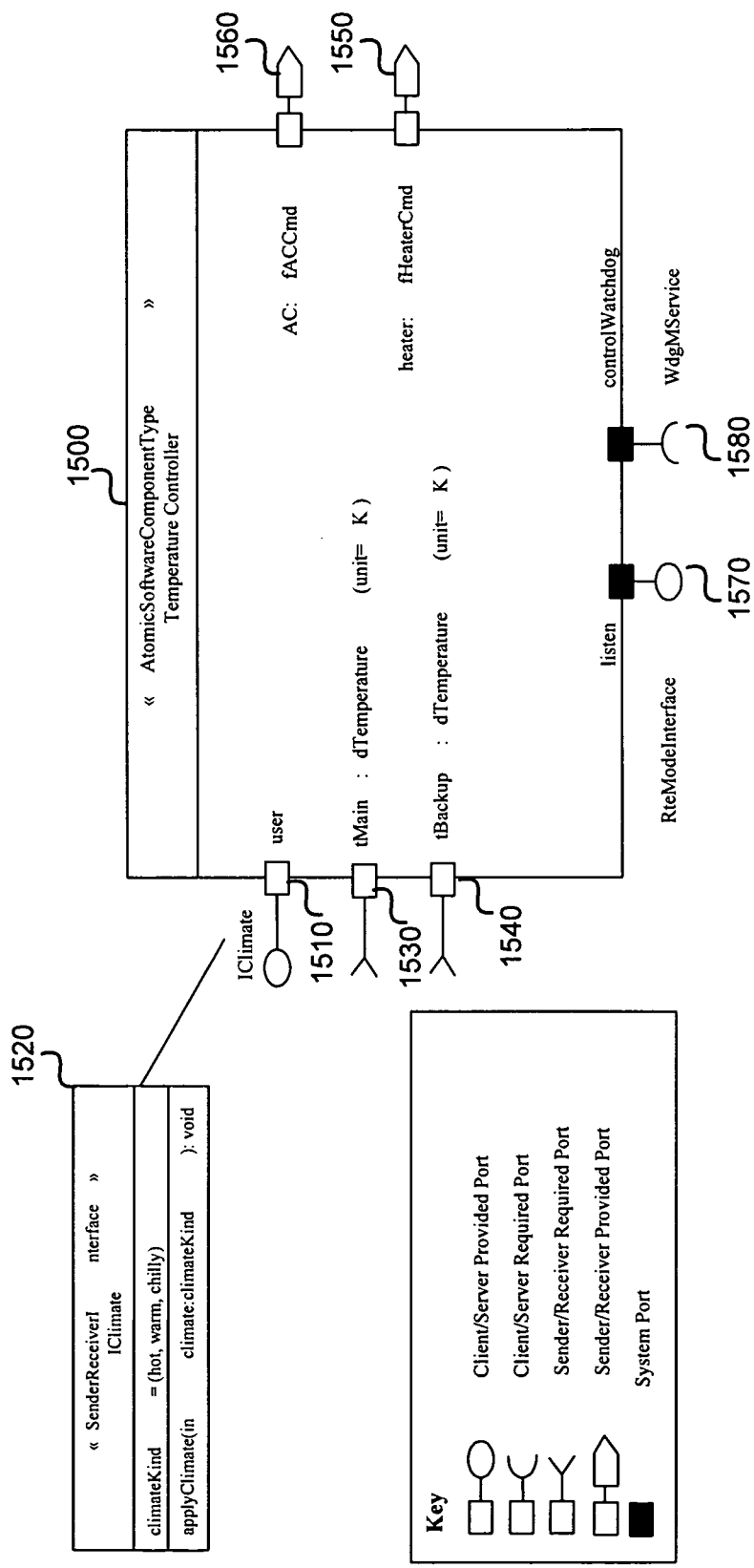

Referring to FIG. 15, software component 1500 can be used to represent the temperature controller that was represented in algorithm component 1400 (FIG. 14). For example, algorithm component 1400 can be included in software component 1500 as a black box. In an embodiment, software component 1500 may provide adapters, error handling, supervision functions, etc., to algorithm component 1400. For example, adapters, ports, etc. can be provided to allow software component 1500 to interact with algorithm component 1400.

In FIG. 15, a port labeled user (port 1510) can be added to software component 1500. Here port 1510 may be a client/server port that provides a service that can be defined in interface 1520. For example, this service may change the climate of the passenger compartment. tMain port 1530 and tBackup port 1540 may be sender/receiver ports that can be added to software component 1500 to accept data from a main and backup temperature sensor. Heater port 1550 and AC port 1560 may be sender/receiver ports that drive heating and cooling system. Listener port 1570 and controlWatchdog port 1580 may be client/server ports that interact with a watchdog manager that may be a standard service provided by platform environment 150.

In some embodiments, adapters may be needed to allow algorithm component 1400 to properly perform in platform environment 150.

Figure 16:
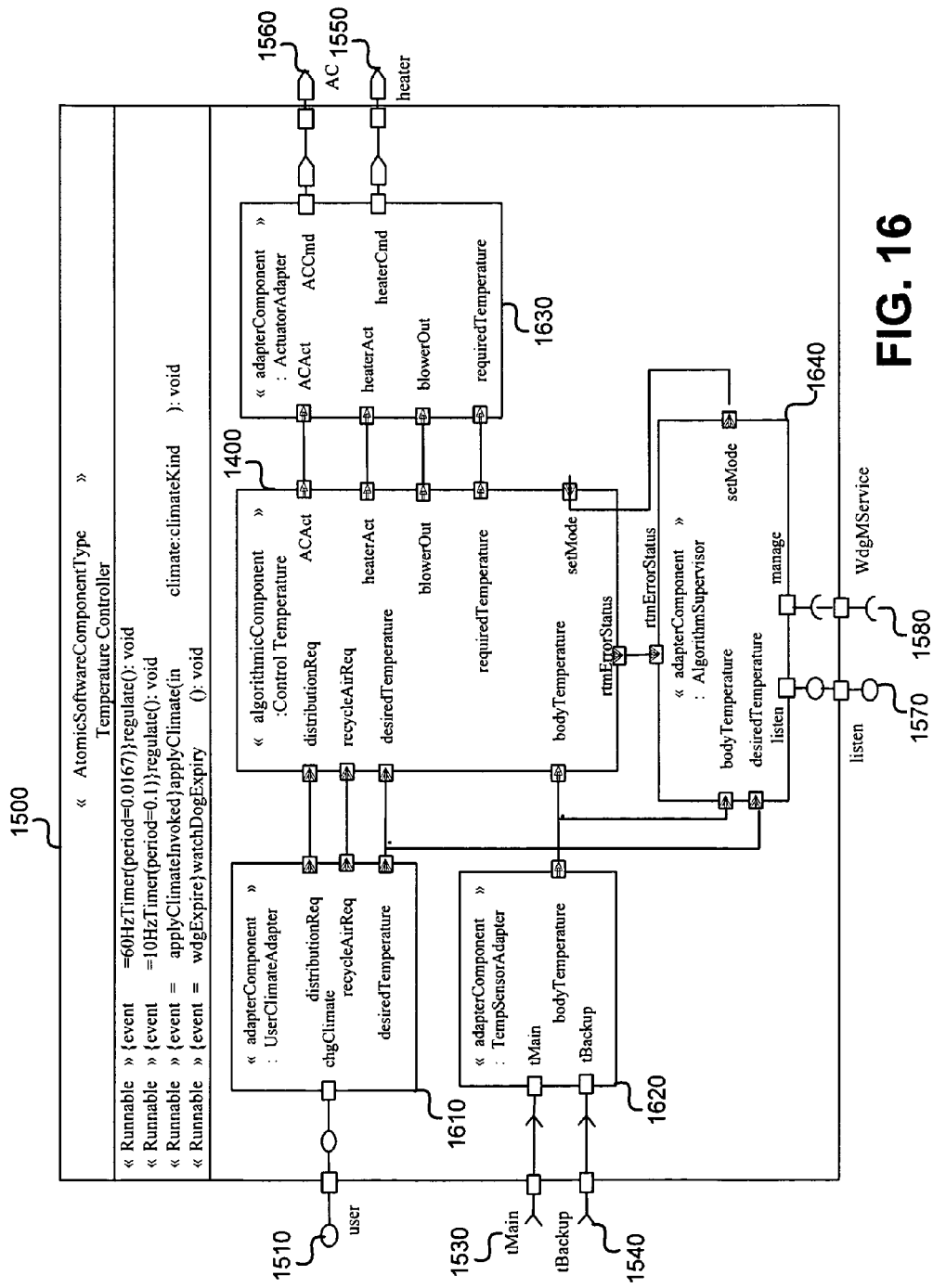

FIG. 16 illustrates algorithm component 1400 wrapped by adapters to allow algorithm component 1400 to communicate with software component 1500. For example, the adapters may be used to allow algorithm component 1400 to interact with the ports illustrated in FIG. 15. In an embodiment, an asynchronous input adapter may be needed to handle sporadic user climate control demands (adapter 1610). In FIG. 16, adapter 1610 may interface port 1510 to algorithm component 1400.

An input adapter may be needed to use redundant sensor inputs to help ensure that the algorithm has access to valid temperature readings (adapter 1620). In FIG. 16, adapter 1620 may interface ports 1530 and 1540 to algorithm component 1400.

An output router may be needed to package outputs of the algorithm for the actuators (adapter 1630). In FIG. 16, adapter 1630 may couple algorithm component to ports 1550 and 1560.

A supervisory adapter may be needed to ensure that the algorithm is working correctly (adapter 1640). In FIG. 16, adapter 1640 may couple ports 1570 and 1580 to algorithm component 1400.

In an embodiment, a system designer may employ off-the-shelf parameterized adapters to address the above functions. In another embodiment, the system engineer may interact with an adapter building tool that provides a user interface that allows the engineer to specify and construct adapters. In still other embodiments, other techniques may be used for retrieving and/or constructing adapters for use with software component 1500 and algorithm component 1400.

When the system engineer tests software component 1500 with adapters 1610-1640 and algorithm component 1400, he may determine that changes should be made to the underlying algorithm to allow the modeled system to perform better. The system engineer may project change information from platform environment 150 to algorithm environment 110. For example, specification changes 710 may be projected from platform environment 150 to algorithm environment 110 via bi-directional logic 430. An algorithm designer may revise algorithm model 115 in response to information in specification changes 710 and may re-project an updated specification to platform environment 150. The updated specification may include changes that satisfy requirements for the system being modeled in platform environment 150.

In an embodiment, software component 1500 may be used in a system model when the updated specification for algorithm component 1400 is received. The system model may execute and may generate one or more execution results (e.g., a curve showing the response of the system). Execution results may be stored in a storage device, displayed using a display device, or transmitted to a destination device, such as a target device.

Exemplary Architecture

Figure 17:
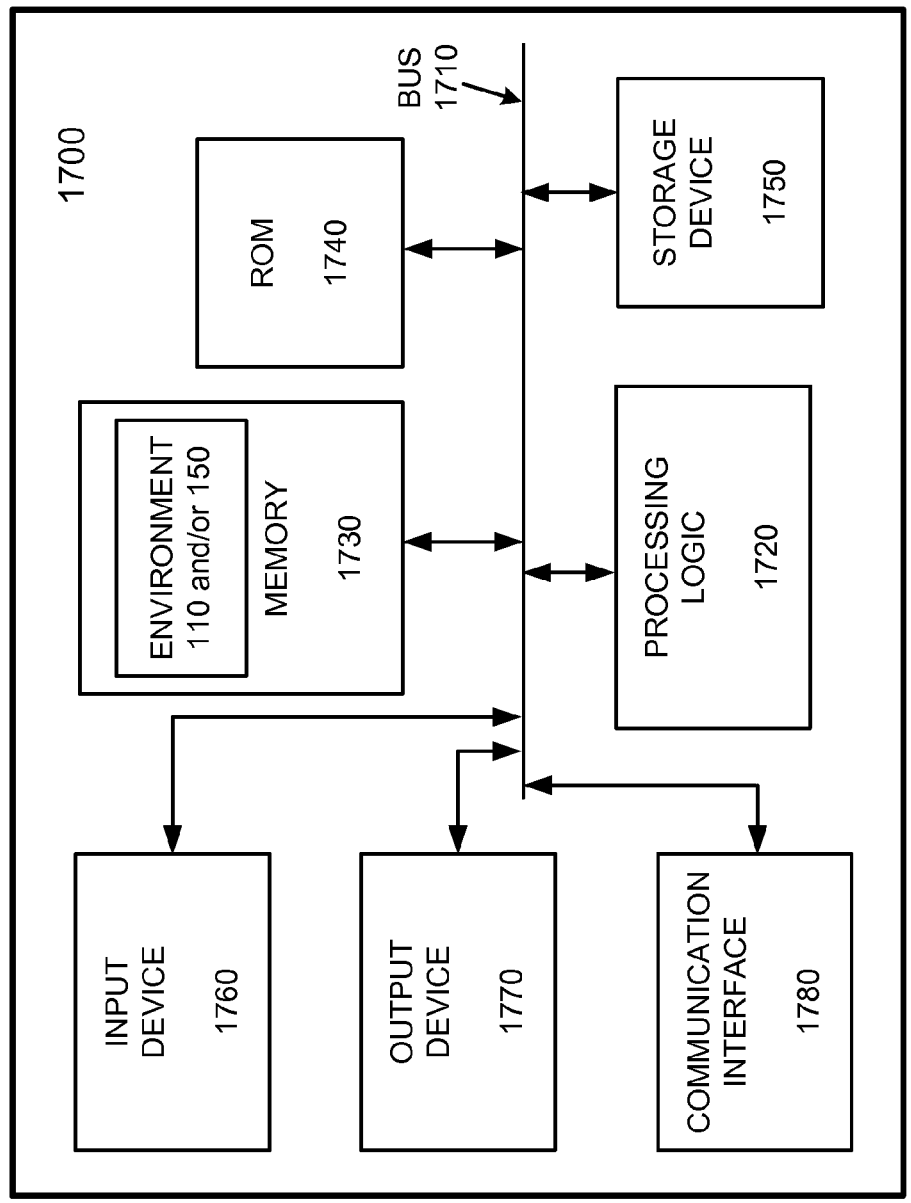
FIG. 17 illustrates an exemplary architecture that can be used to implement an exemplary embodiment.

FIG. 17 illustrates an exemplary architecture that can be used to implement an exemplary embodiment. FIG. 17 illustrates an exemplary computer architecture (referred to as "entity 1700" hereinafter) that can be used to implement algorithm environment 110, platform environment 150, bi-directional logic 430, code generator 935, etc. As illustrated, entity 1700 may include a bus 1710, processing logic 1720, a main memory 1730, a read-only memory (ROM) 1740, a storage device 1750, an input device 1760, an output device 1770, and/or a communication interface 1780. Bus 1710 may include a path that permits communication among the components of entity 1700.

Processing logic 1720 may include a processor, microprocessor, or other types of processing logic that may interpret and execute instructions. In one implementation, processing logic 1720 may include a single core processor or a multi-core processor. In another implementation, processing logic 1720 may include a single processing device or a group of processing devices, such as a processor cluster or computing grid. In still another implementation, processing logic 1720 may include multiple processors that may be local or remote with respect each other, and may use one or more threads while processing. In a further implementation, processing logic 1720 may include multiple processors implemented as hardware units of execution capable of running copies of a technical computing environment.

Main memory 1730 may include a random access memory (RAM) or another type of dynamic storage device that may store information and instructions for execution by processing logic 1720. ROM 1740 may include a ROM device or another type of static storage device that may store static information and/or instructions for use by processing logic 1720. Storage device 1750 may include a magnetic and/or optical recording medium and its corresponding drive, or another type of static storage device (e.g., a disk drive, solid state memory device, etc.) that may store static information and/or instructions for use by processing logic 1720.

Input device 1760 may include logic that permits an operator to input information to entity 1700, such as a keyboard, a mouse, a multi-point input such as a touch pad, a pen, a microphone, voice recognition and/or biometric mechanisms, etc. Output device 1770 may include logic that outputs information to the operator, including a display, a printer, a speaker, etc. Communication interface 1780 may include any transceiver-like logic that enables entity 1700 to communicate with other devices and/or systems. For example, communication interface 1780 may include mechanisms for communicating with another device or system via a network.

Entity 1700 depicted in FIG. 17 may perform certain operations in response to processing logic 1720 executing software instructions contained in a computer-readable medium, such as main memory 1730. A computer-readable medium may be defined as a physical or logical memory device. The software instructions may be read into main memory 1730 from another computer-readable medium, such as storage device 1750, or from another device via communication interface 1780. The software instructions contained in main memory 1730 may cause processing logic 1720 to perform processes described herein. Alternatively, hardwired circuitry may be used in place of or in combination with software instructions to implement processes described herein. Thus, implementations described herein are not limited to any specific combination of hardware circuitry and software.

Although FIG. 17 shows exemplary components of entity 1700, in other implementations, entity 1700 may contain fewer, different, or additional components than depicted in FIG. 17. In still other implementations, one or more components of entity 1700 may perform one or more tasks described as being performed by one or more other components of entity 1700.

Exemplary Processing

FIG. 18 illustrates an exemplary processing that can be used to practice an embodiment. An algorithm may be specified in algorithm environment 110 (act 1805). The specified algorithm may be realized using an algorithm model 115. In some instances it may be desirable to use the algorithm in another environment, such as a platform environment 150. Algorithm environment 110 may generate a specification that includes information pertinent to algorithm model 115, such as information about functional aspects of the algorithm (act 1810).

Algorithm environment 110 may project the specification to platform environment 150 using bi-directional logic 430 (act 1815). In an embodiment, bi-directional logic may project the specification without transforming the specification. Platform environment 150 may incorporate the specification into a system model using an algorithm component 155 (act 1820). In an embodiment, algorithm component 155 may include the functional aspects of the algorithm.

In platform environment 150, it may be determined that the algorithm should be modified. In an embodiment, one or more desired changes can be identified for the algorithm (act 1825). Platform environment 150 may send information about the requested changes to algorithm environment 110 using bi-directional logic 430 (act 1830).

Algorithm environment 110 may modify the algorithm and/or algorithm model 115 and may produce a modified, or updated, specification (act 1835). Algorithm environment 110 may project the updated specification to platform environment 150 using bi-directional logic 430 (act 1840). Platform environment 150 may incorporate the information from the updated specification into an updated algorithm component and may use the updated algorithm component in a system model.

Platform environment 150 may generate code for the system model (act 1845). For example, when the system model performs in a determined manner, executable code may be generated to run on a target device. The generated code may include code for the algorithm and for other components, e.g., system components that are in the system model. Platform environment 150 can provide the generated code to the target device or to another device.

The embodiment described in FIG. 18 can perform additional processing activities in addition to or instead of acts described above. For example, algorithm model 115 may be tested using a test harness to verify operation of algorithm model 115. In act 1815, the test harness can be projected to platform environment 150 along with specification 130. In act 1820, platform environment 150 may incorporate the test harness into a system model so that an algorithm component representing algorithm model 115 can be tested in platform environment 150.

Alternative Implementations

TCE's that can be used with exemplary embodiments can be text-based, graphically-based, or can be both text and graphically based. Examples of some text-based TCE's that can be used to practice embodiments of the invention are, but are not limited to, MATLAB® software by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim.

Examples of graphically-based TCE's can include products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; or aspects of a Unified Modeling Language (UML) or SysML environment.

CONCLUSION

Implementations may allow information to be projected from one domain, or environment, to another domain, or environment and back again.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 11A-D and FIG. 18, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Logic, such as devices, components, software, etc., may be added and/or removed from the implementations of FIGS. 1, 2, 4, and 17 depending on specific deployments and/or applications. Further, disclosed implementations may not be limited to any specific combination of logic.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and sub-headings used herein are to aid the reader by dividing the specification into subsections. These headings and sub-headings are not to be construed as limiting the scope of the invention or as defining features of the invention.

The scope of the invention is defined by the claims and their equivalents.

What is claimed is:

1. One or more non-transitory computer-readable media storing instructions, the instructions comprising:
   one or more instructions which, when executed by at least one processor, cause the at least one processor to identify an algorithm model in an algorithm environment,
      the algorithm model being used to test one or more algorithms that are each associated with an operation of a vehicle control system,
      each algorithm receiving an input from a particular component, of a plurality of components, of the vehicle control system, and
      the algorithm environment being a design environment;
   one or more instructions which, when executed by the at least one processor, cause the at least one processor to generate a specification associated with the algorithm model, the specification including information for representing the algorithm model in a platform environment,
      the platform environment being a deployment environment, and
      the platform environment being used to model the plurality of components and one or more operations of the vehicle control system;
   one or more instructions which, when executed by the at least one processor, cause the at least one processor to map the generated specification to a model, implemented in the platform environment, to cause the platform environment to generate an algorithm component that represents the algorithm model in the platform environment;
   one or more instructions which, when executed by the at least one processor, cause the at least one processor to receive, from the platform environment, one or more changes to the generated specification, the one or more changes to the generated specification containing information regarding one or more modifications made to the algorithm component in the platform environment;
   one or more instructions which, when executed by the at least one processor, cause the at least one processor to modify, in the algorithm environment, the algorithm model based on the received one or more changes to the generated specification;
   one or more instructions which, when executed by the at least one processor, cause the at least one processor to map the modified algorithm model to the platform environment;
   one or more instructions which, when executed by the at least one processor, cause the at least one processor to generate an intermediate representation of the modified algorithm model;
   one or more instructions which, when executed by the at least one processor, cause the at least one processor to merge the intermediate representation of the modified algorithm model with an intermediate representation of another model;
   one or more instructions which, when executed by the at least one processor, cause the at least one processor to generate code based on the merged intermediate representation of the modified algorithm model and the intermediate representation of the other model; and
   one or more instructions which, when executed by the at least one processor, cause the at least one processor to store the generated code.

2. The media of claim 1, where the specification identifies one or more features of the algorithm model that are used by the model.

3. The media of claim 1, where the instructions further comprise:
   one or more instructions to perform verification or validation of the algorithm model.

4. The media of claim 3, where verification or validation of the algorithm model is performed using particular information associated with the algorithm model, the instructions further comprising:
   one or more instructions to maintain a relationship between the particular information, where:
      a first portion of the particular information is associated with verification or validation performed prior to the mapping, and
      a second portion of the particular information is associated with verification or validation performed after receiving the one or more changes.

5. The media of claim 3, where the instructions further comprise:
   one or more instructions to generate particular information associated with the verification or the validation of the algorithm model; and
   one or more instructions to map the particular information to the platform environment, the particular information being used in the platform environment to validate or verify the algorithm model, the model, or the modified algorithm model.

6. The media of claim 1, where at least a portion of the algorithm model is mapped to at least a portion of the model.

7. The media of claim 1, where the one or more instructions to modify the algorithm model based on the specification changes further includes:

one or more instructions to optimize algorithm logic, which implements the algorithm model in the model, to improve operation of the algorithm model in the platform environment.

8. One or more non-transitory computer-readable media storing instructions, the instructions comprising:
one or more instructions which, when executed by at least one processor, cause the at least one processor to identify an algorithm model in an algorithm environment, the algorithm model including:
an input port to receive an input signal,
an output port to provide an output signal to a destination,
one or more algorithms that operate on the input signal to produce the output signal, and
one or more elements that interact, when the algorithm model is executed, with the input port, the output port, or the one or more algorithms, the one or more elements including information for representing the algorithm model in a platform environment,
the algorithm model being used to test the one or more algorithms,
the one or more algorithms each being associated with an operation of a vehicle control system,
each algorithm receiving an input from a particular component, of a plurality of components, of the vehicle control system,
the algorithm environment being a design environment,
the platform environment being a deployment environment, and
the platform environment being used to model the plurality of components and one or more operations of the vehicle control system;
one or more instructions which, when executed by the at least one processor, cause the at least one processor to identify at least one of the one or more elements;
one or more instructions which, when executed by the at least one processor, cause the at least one processor to map the identified at least one element to a model, implemented in the platform environment, to cause the platform environment to generate an algorithm component that represents the algorithm model in the platform environment, the algorithm component providing for the model to interact with:
a representation of the input port,
a memory,
a representation of the output port, or
a representation of the identified at least one element;
one or more instructions which, when executed by the at least one processor, cause the at least one processor to receive, from the platform environment, one or more changes to the identified at least one element, the changes to the identified at least one element containing information regarding one or more modifications made to the algorithm component in the platform environment;
one or more instructions which, when executed by the at least one processor, cause the at least one processor to modify, in the algorithm environment, the algorithm model based on the received one or more changes to the identified at least one element;
one or more instructions which, when executed by the at least one processor, cause the at least one processor to map the modified algorithm model to the platform environment;
one or more instructions which, when executed by the at least one processor, cause the at least one processor to generate an intermediate representation of the modified algorithm model;
one or more instructions which, when executed by the at least one processor, cause the at least one processor to merge the intermediate representation of the modified algorithm model with an intermediate representation of another model;
one or more instructions which, when executed by the at least one processor, cause the at least one processor to generate code based on the merged intermediate representation of the modified algorithm model and the intermediate representation of the other model; and
one or more instructions which, when executed by the at least one processor, cause the at least one processor to store the generated code.

9. The media of claim 8, where the algorithm component is interfaced to the model via an adapter.

10. A method comprising:
identifying an algorithm model in an algorithm environment, the identifying being performed by a computing device,
the algorithm model being used to test one or more algorithms that are each associated with an operation of a hardware control system,
each algorithm receiving an input from a particular component, of a plurality of components, of the hardware control system, and
the algorithm environment being a design environment;
generating a specification associated with the algorithm model, the specification including information for representing at least a portion of the algorithm model in a platform environment, the generating being performed by the computing device,
the platform environment being a deployment environment, and
the platform environment being used to model the plurality of components and one or more operations of the hardware control system;
mapping the generated specification to a platform environment, to cause the platform environment to generate an algorithm component that represents the algorithm model in the platform environment, the mapping being performed by the computing device;
receiving, from the platform environment, one or more changes, made in the platform environment, to the generated specification, the receiving being performed by the computing device;
modifying the algorithm model, in the algorithm environment, based on the one or more changes made to the generated specification in the platform environment, the modifying being performed by the computing device;
mapping the modified algorithm model to the platform environment, the mapping the modified algorithm model to the platform environment being performed by the computing device;
generating an intermediate representation of the modified algorithm model, the generating the intermediate representation of the modified algorithm model being performed by the computing device;
merging the intermediate representation of the modified algorithm model with an intermediate representation of another model, the merging being performed by the computing device;
generating code based on the merged intermediate representation of the modified algorithm model and the intermediate representation of the other model, the generating the code being performed by the computing device; and storing the generated code in a storage device, the storing being performed by the computing device.

11. A system comprising:

a processor; and a memory device that contains instructions which, when executed by the processor, cause the processor to:

identify an algorithm model in an algorithm environment, the algorithm model being used to test one or more algorithms that are each associated with an operation of a hardware control system, each algorithm receiving an input from a particular component, of a plurality of components, of the hardware control system, and the algorithm environment being a design environment;

generate a specification, the specification including information for representing the algorithm model in a platform environment, the platform environment being a deployment environment, and the platform environment being used to model the plurality of components and one or more operations of the hardware control system;

map the generated specification to the platform environment, to cause the platform environment to generate an algorithm component that represents the algorithm model in the platform environment;

interface the algorithm component with a system component by an adapter that communicatively couples the algorithm component to the system component;

receive, from the platform environment, one or more changes to the generated specification;

generate a modified algorithm model based on the one or more changes to the generated specification;

map the modified algorithm model to the platform environment;

generate an intermediate representation of the modified algorithm model;

merge the intermediate representation of the modified algorithm model with an intermediate representation of another model;

generate code based on the merged intermediate representation of the modified algorithm model and the intermediate representation of the other model;

store the generated code; and test the modified algorithm model and the system component to determine if changes need to be made to the modified algorithm model.

12. The system of claim 11, where the one or more changes to the generated specification identify information regarding a port to be added to the algorithm model.

13. The system of claim 11, where the adapter is to change a numeric type from a first format, associated with the algorithm model, to a second format, associated with the system component.

14. The system of claim 11, where the processor further is to:

perform verification or validation of the algorithm model prior to the mapping the generated specification to the platform environment.

15. The system of claim 14, where, when performing verification or validation, the processor further is to:

generate particular information associated with the verification or the validation of the algorithm model; and map the particular information to the platform environment, the particular information being used in the platform environment to validate or verify the algorithm model or the modified algorithm model.

16. The system of claim 11, where the processor further is to:

verify or validate the algorithm model using particular information associated with the algorithm model, a first portion of the particular information being associated with verification or validation performed prior to the mapping the generated specification to the platform environment, and a second portion of the particular information being associated with verification or validation performed after receiving the one or more changes to the generated specification.

17. The method of claim 10, further comprising:

performing verification or validation of the algorithm model prior to the mapping the generated specification to the platform environment.

18. The method of claim 17, further comprising:

generating particular information associated with the verification or the validation of the algorithm model; and mapping the particular information to the platform environment, the particular information being used in the platform environment to validate or verify the algorithm model or the modified algorithm model.

19. The method of claim 10, further comprising:

verifying or validating the algorithm model using particular information associated with the algorithm model, a first portion of the particular information being associated with verification or validation performed prior to mapping the generated specification to the platform environment, and a second portion of the particular information being associated with verification or validation performed after receiving the one or more changes.

20. The media of claim 8, further comprising:

one or more instructions to perform verification or validation of the algorithm model, the verification or validation of the algorithm model being performed using particular information associated with the algorithm model; and one or more instructions to maintain a relationship between the particular information, where:

a first portion of the information is associated with verification or validation performed prior to the mapping, and a second portion of the particular information is associated with verification or validation performed after receiving the one or more changes.

* * * * *